US012682640B2

(12) United States Patent
Ka et al.

(10) Patent No.: US 12,682,640 B2
(45) Date of Patent: Jul. 14, 2026

(54) COOKING APPARATUS AND METHOD OF CONTROLLING THE SAME

(71) Applicant: SAMSUNG ELECTRONICS CO., LTD., Suwon-si (KR)

(72) Inventors: Keehwan Ka, Suwon-si (KR); Seongjoo Han, Suwon-si (KR); Yoonhee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 493 days.

(21) Appl. No.: 18/207,894

(22) Filed: Jun. 9, 2023

(65) Prior Publication Data

US 2024/0071077 A1     Feb. 29, 2024

Related U.S. Application Data

(63) Continuation of application No. PCT/KR2023/007240, filed on May 26, 2023.

(30) Foreign Application Priority Data

Aug. 24, 2022   (KR) ........................ 10-2022-0106446
Jan. 27, 2023   (KR) ........................ 10-2023-0010835

(51) Int. Cl.
*G06V 20/40*        (2022.01)
*A47J 36/32*        (2006.01)
(Continued)

(52) U.S. Cl.
CPC ............ *G06V 20/47* (2022.01); *A47J 36/321* (2018.08); *G06V 20/48* (2022.01); *G06V 20/49* (2022.01);
(Continued)

(58) Field of Classification Search
None
See application file for complete search history.

(56) References Cited

U.S. PATENT DOCUMENTS 5,361,681 A    11/1994  Hedström et al.
5,736,717 A     4/1998  Lee et al.
(Continued)

FOREIGN PATENT DOCUMENTS

CN        110779056 A     2/2020
JP       2003-255981      9/2003
(Continued)

OTHER PUBLICATIONS

International Search Report dated Sep. 15, 2023 issued in PCT Application No. PCT/KR2023/007240.
(Continued)

*Primary Examiner* — Eileen M Adams
(74) *Attorney, Agent, or Firm* — STAAS & HALSEY LLP

(57) ABSTRACT

A cooking apparatus including: a chamber; a camera configured to photograph a cooking object placed in the chamber; and a controller to be electrically connected to the camera, the controller configured to: control the camera to acquire a plurality of image frames of the cooking object while cooking is being performed; identify a change in a state of the cooking object in the chamber from the acquired plurality of image frames; extract a portion of image frames among the acquired plurality of image frames based on the change in the state of the cooking object; and add a sound corresponding to the change in the state of the cooking object to the extracted portion of image frames to generate a summary video of a cooking process.

20 Claims, 15 Drawing Sheets

(51) Int. Cl.

| | | |
|---|---|---|
| *G06V 20/68* | (2022.01) | |
| *G10K 15/02* | (2006.01) | |
| *G11B 27/036* | (2006.01) | |

(52) U.S. Cl.
CPC ............. *G06V 20/68* (2022.01); *G10K 15/02* (2013.01); *G11B 27/036* (2013.01)

(56) References Cited

U.S. PATENT DOCUMENTS

| | | | |
|---|---|---|---|
| 11,022,322 B2 | 6/2021 | Clayton et al. | |
| 11,156,367 B2 | 10/2021 | Bierbaum et al. | |
| 11,187,417 B2 | 11/2021 | Bhogal et al. | |
| 2014/0298378 A1* | 10/2014 | Kelley | H04N 21/8133 |
| | | | 725/32 |
| 2015/0056344 A1 | 2/2015 | Luckhardt | |
| 2019/0053332 A1 | 2/2019 | Cheng et al. | |
| 2020/0315400 A1* | 10/2020 | Mansueto | F24B 13/004 |
| 2021/0161329 A1 | 6/2021 | Kim | |
| 2021/0251263 A1 | 8/2021 | Knighton et al. | |
| 2022/0117274 A1* | 4/2022 | Bhogal | A47J 36/32 |
| 2022/0287500 A1 | 9/2022 | Yoon | |
| 2022/0311927 A1 | 9/2022 | Ka et al. | |
| 2023/0238033 A1* | 7/2023 | Kim | G06V 20/68 |
| | | | 386/200 |

FOREIGN PATENT DOCUMENTS

| | | |
|---|---|---|
| JP | 2006-333189 | 12/2006 |
| KR | 10-0189504 | 6/1999 |
| KR | 10-2006-0083552 | 7/2006 |
| KR | 10-2018-0015926 | 2/2018 |
| KR | 10-2019-0120953 | 10/2019 |
| KR | 10-2021-0030796 | 3/2021 |
| KR | 10-2021-0066452 | 6/2021 |
| KR | 10-2021-0138485 | 11/2021 |
| KR | 10-2022-0040228 | 3/2022 |
| KR | 10-2022-0041611 | 4/2022 |
| WO | WO 2020/014159 A1 | 1/2020 |
| WO | WO 2022/065641 A1 | 3/2022 |

OTHER PUBLICATIONS

Written Opinion dated Sep. 15, 2023 issued in PCT Application No. PCT/KR2023/007240.

Supplementary European Search Report dated Jun. 26, 2025 issued in European Application No. EP 23 85 7484.

European Office Action dated Dec. 19, 2025 for European Application No. 23857484.2.

* cited by examiner

FRONT ◄──►BACK

DOWN

| | Phase 1 | Phase 2 | Phase 3 | Phase 4 | Phase 5 |
|---|---|---|---|---|---|
| COOKING TIME | t0~t1 | t1~t2 | t2~t3 | t3~t4 | t4~t5 |
| COOKING OBJECT | | | | | |
| CHANGE AMOUNT IN STATE OF COOKING OBJECT | 5 | 30 | 35 | 50 | 55 |

FIG. 8
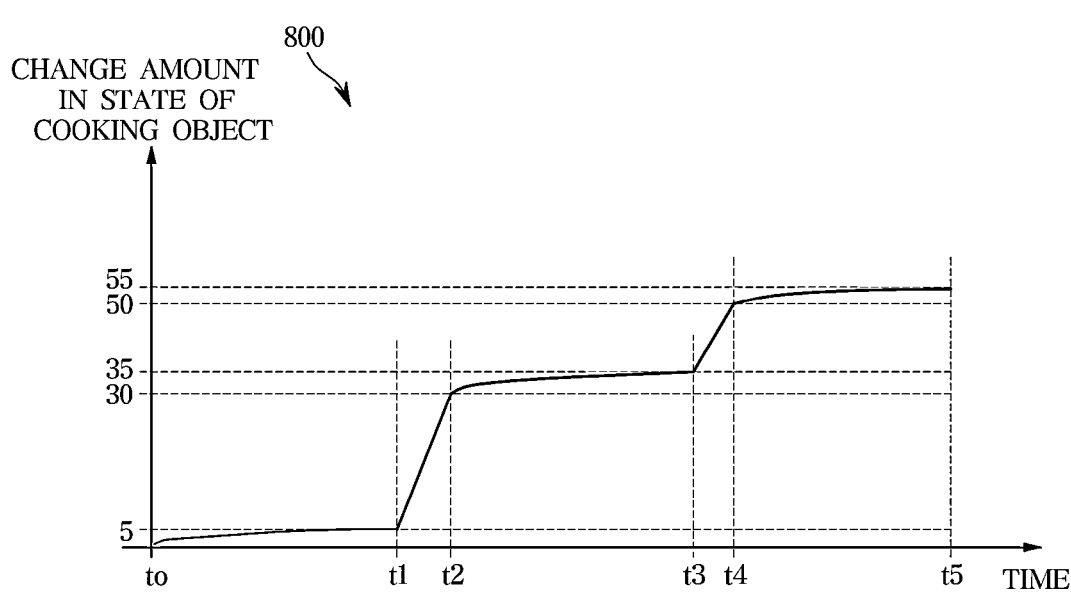
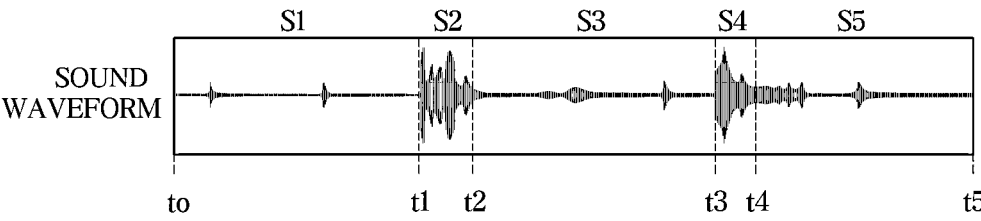

| COOKING OBJECT | SOUND INFORMATION |
|---|---|
| MEAT | WHITE SOUND, GRILLING SOUND, OIL SPLASHING SOUND, POPPING SOUND, EVAPORATION SOUND |
| FISH | WHITE SOUND, GRILLING SOUND, OIL SPLASHING SOUND, POPPING SOUND, EVAPORATION SOUND |
| FRIED FOOD | WHITE SOUND, OIL SPLASHING SOUND, EVAPORATION SOUND |
| PIZZA | WHITE SOUND, GRILLING SOUND, SIZZLING SOUND, EVAPORATION SOUND |
| SOUP AND STEW | WHITE SOUND, LIQUID BOILING SOUND |
| BREAD | WHITE SOUND |
| ... | ... |

FIG. 15

COOKING APPARATUS AND METHOD OF CONTROLLING THE SAME

CROSS-REFERENCE TO RELATED APPLICATIONS

This application is a continuation application, filed under 35 U.S.C. § 111(a), of International Application PCT/KR2023/007240 filed on May 26, 2023, and is based on and claims priority under 35 U.S.C. § 119 to Korean Patent Applications No. 10-2022-0106446, filed on Aug. 24, 2022, and No. 10-2023-0010835, filed on Jan. 27, 2023, in the Korean Intellectual Property Office, the disclosures of which are incorporated by reference herein in their entireties.

BACKGROUND

Field

The disclosure relates to a cooking apparatus and a method of controlling the same.

Description of Related Art

A cooking apparatus is an apparatus for heating and cooking a cooking object, such as food, and refers to an apparatus capable of providing various cooking related functions, such as heating, thawing, drying, and sterilizing of a cooking object. Examples of the cooking apparatus may include an oven, such as a gas oven or an electric oven, a microwave heating device (hereinafter referred to as a microwave oven), a gas range, an electric range, a gas grill, or an electric grill.

In general, an oven cooks food by directly transferring heat to food or heating the inside of a cooking chamber using a heat source that generates heat. A microwave oven cooks food using frictional heat of molecules in food that is generated by disturbing the arrangement of molecules using high frequency as a heating source.

Recently, a technology has emerged that installs a camera in a chamber of a cooking apparatus and provides a user with an image acquired by the camera.

SUMMARY

A cooking apparatus includes: a chamber; a camera configured to photograph a cooking object placed in the chamber; and a controller to be electrically connected to the camera, the controller configured to control the camera to acquire a plurality of image frames of the cooking object while cooking of the cooking object is being performed, identify a change in a state of the cooking object in the chamber from the acquired plurality of image frames, extract a portion of image frames among the plurality of image frames based on the change in the state of the cooking object, and add a sound corresponding to the change in the state of the cooking object to the extracted portion of image frames to generate a summary video of a cooking process.

The controller is configured to generate a raw video based on the acquired plurality of image frames, divide the generated raw video into a plurality of sections based on the change in the state of the cooking object; and extract at least one image frame from each of the divided plurality of sections to acquire the extracted portion of image frames.

The controller is configured to compare a reference image frame with each of the acquired plurality of image frames to determine an amount of the change in the state of the cooking object in each of the acquired plurality of image frames; detect at least one of a phase-change section in which a slope of the amount of the change in the state of the cooking object is greater than or equal to a predetermined threshold value and a phase-holding section in which a slope of the amount of the change in the state of the cooking object is less than the threshold value; and divide the raw video into the plurality of sections based on the at least one of the phase-change section and the phase-holding section.

The controller is configured to, based on the change in the state of the cooking object being different in each of the divided plurality of sections, add a different sound to each of the divided plurality of sections.

The cooking apparatus further comprises a memory that stores a sound matching table including sound information that matches with a property of the cooking object and a change in a state of the cooking object, wherein the controller is configured to use the sound matching table to determine the sound to be added to each of the divided plurality of sections.

The cooking apparatus further comprises a memory that stores a sound matching table including sound information that matches with at least one property of the cooking object and at least one change in a state of the cooking object, wherein the controller is configured to: based on a plurality of cooking objects being identified in the chamber, identify properties of the plurality of cooking objects and changes in states of the plurality of cooking objects; synthesize a plurality of sounds respectively matching with the properties of the plurality of cooking objects and the changes in the states of the plurality of cooking objects to generate a harmonious sound; and add the harmonious sound to the extracted portion of image frames.

The controller is configured to determine a volume of each of the plurality of sounds to be different based on the property of each of the plurality of cooking objects.

The controller is configured to insert metadata including time information, cooking object state information and sound information into each of the image frames in the extracted portion.

The controller is configured to detect at least one of a change in a size of the cooking object, a change in a form of the cooking object, a change in a color of the cooking object, and a change in a texture of the cooking object to identify the change in the state of the cooking object.

The cooking apparatus further comprises a communication circuit configured to communicate with a server, wherein the controller is configured to control the communication circuit to transmit, to the server, display information to display the summary video to a user device.

A method of controlling a cooking apparatus: controlling a camera to acquire a plurality of image frames of a cooking object placed in the chamber while cooking of the cooking object is being performed; identifying a change in a state of a cooking object in a chamber from the acquired plurality of image frames; extracting a portion of image frames among the acquired plurality of image frames based on the change in the state of the cooking object; and generating a summary of video of a cooking process by adding a sound corresponding to the change in the state of the cooking object to the extracted portion of image frames.

The extracting of the portion of image frames includes: generating a raw video based on the acquired plurality of image frames; dividing the generated raw video into a plurality of sections based on the change in the state of the cooking object; and extracting at least one image frame from each of the divided plurality of sections to acquire the extracted portion of image frames.

The dividing into the plurality of sections includes: comparing a reference image frame with each of the acquired plurality of image frames to determine an amount of the change in the state of the cooking object in each of the acquired plurality of image frames; detecting at least one of a phase-change section in which a slope of the amount of the change in the state of the cooking object is greater than or equal to a predetermined threshold value or a phase-holding section in which a slope of the amount of the change in the state of the cooking object remains less than the threshold value; and dividing the raw video into the plurality of sections based on the at least one of the phase-change section and the phase-holding section.

The generating of the summary video includes, based on the change in the state of the cooking object being different in each of the divided plurality of sections, adding a different sound to each of the divided plurality of sections.

The generating of the summary video includes: acquiring a sound matching table including sound information that matches with a property of the cooking object and a change in a state of the cooking object; and using the sound matching table to determine the sound to be added to each of the divided plurality of sections.

The identifying of the change in the state of the cooking object includes, based on a plurality of cooking objects being identified in the chamber, identifying properties of the plurality of cooking objects and changes in states of the plurality of cooking objects, and the generating of the summary video include:

acquiring a sound matching table including sound information that matches with a property of the cooking object and a change in a state of the cooking object; generating a harmonious sound by synthesizing a plurality of sounds respectively matching with the properties of the plurality of cooking objects and the changes in the states of the plurality of cooking objects; and adding the harmonious sound to the extracted portion of image frames.

The generating of the harmonious sound includes determining a volume of each of the plurality of sounds to be different based on the property of each of the plurality of cooking objects.

The generating of the harmonious sound includes inserting metadata including time information, cooking object state information and sound information into each of the image frames in the extracted portion.

The identifying of the change in the state of the cooking object includes detecting at least one of a change in a size of the cooking object, a change in a form of the cooking object, a change in a color of the cooking object, and a change in a texture of the cooking object.

The method further comprises controlling a communication circuit to transmit, to the server, display information for displaying the summary video to a user device.

BRIEF DESCRIPTION OF THE DRAWINGS

FIG. 1 illustrates a network system implemented by various electronic devices.

FIG. 7 is a table for describing a change in a state of a cooking object over time.

FIG. 8 illustrates a graph showing the amount of the change in the state of the cooking object described with reference to FIG. 7 and waveforms of sounds added to a plurality of sections classified according to the change in the state of the cooking object.

FIG. 9 illustrates a sound matching table according to an embodiment.

FIG. 15 is a flowchart for describing another example of interaction between a cooking apparatus, a server, and a user device.

DETAILED DESCRIPTION

Figure 2:
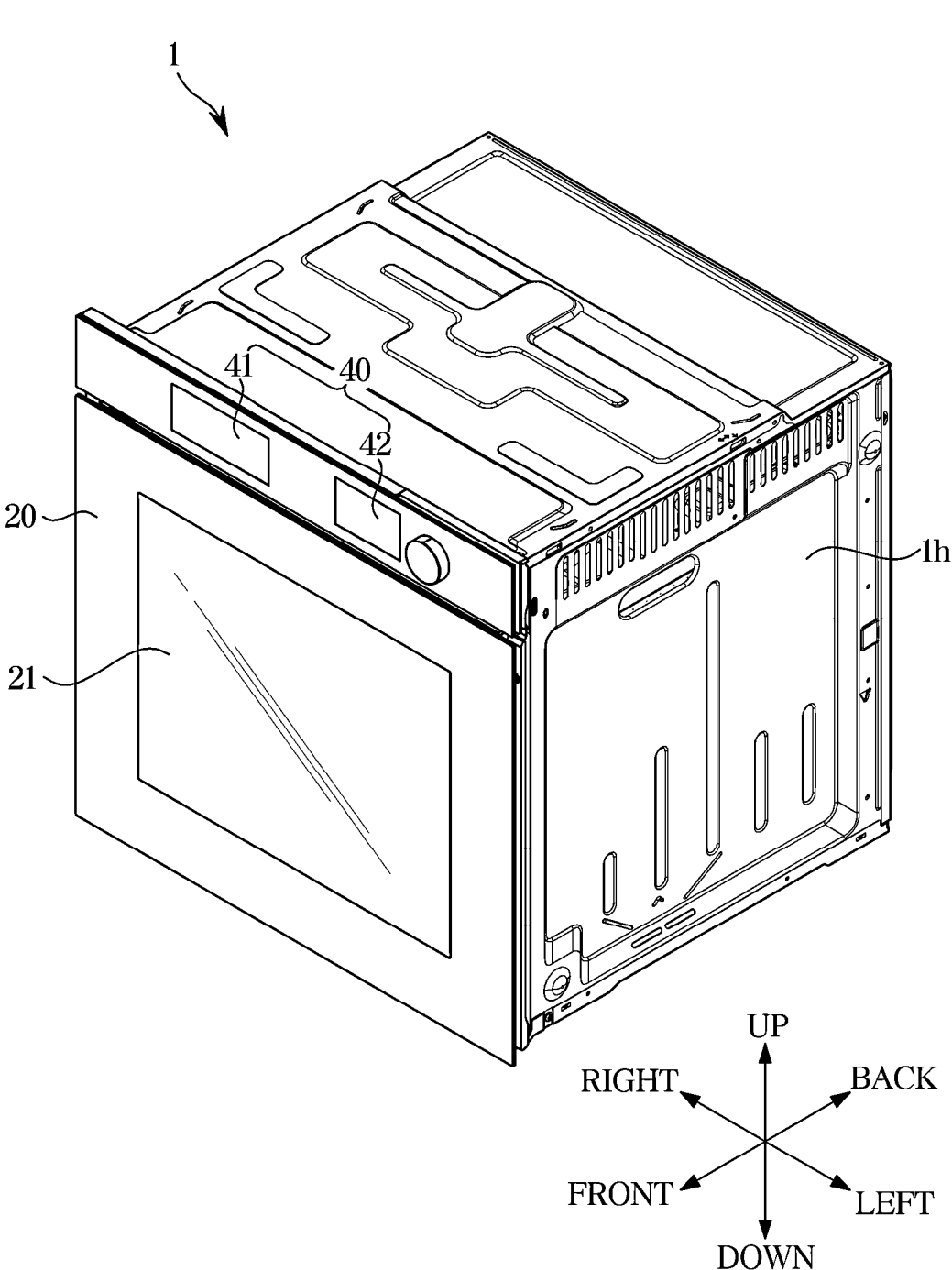
FIG. 2 is a perspective view illustrating a cooking apparatus according to an embodiment.

The various embodiments of the disclosure and terminology used herein are not intended to limit the technical features of the disclosure to the specific embodiments, but rather should be understood to cover all modifications, equivalents, and alternatives falling within the spirit and scope of the disclosure.

In the description of the drawings, like numbers refer to like elements throughout the description of the drawings.

The singular forms preceded by "a," "an," and "the" corresponding to an item are intended to include the plural forms as well unless the context clearly indicates otherwise.

In the disclosure, a phrase such as "A or B," "at least one of A and B," "at least one of A or B," "A, B or C," "at least one of A, B and C," and "at least one of A, B, or C" may include any one of the items listed together in the corresponding phrase of the phrases, or any possible combination thereof.

For example, the expression "at least one of A and B" includes any of the following: A, B, A and B. The expression "at least one of A, B, and C" includes any of the following: A, B, C, A and B, A and C, B and C, A and B and C.

Terms, such as "first," "second," etc. are used to distinguish one element from another and do not modify the elements in other aspects (e.g., importance or sequence).

When one (e.g., a first) element is referred to as being "coupled" or "connected" to another (e.g., a second) element with or without the term "functionally" or "communicatively," it means that the one element is connected to the other element directly, wirelessly, or via a third element.

The terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

When an element is referred to as being "connected to," "coupled to," or "supported on" another element, it can be directly connected, coupled, or supported to or on the other element or indirectly connected, coupled, or supported to or on the other element through a third element.

When an element is referred to as being "on" another element, it y be directly on the other element, or an intervening element may also be present.

The term "and/or" includes any combination of a plurality of related items or any one of a plurality of related items.

Hereinafter, the operating principles and embodiments of the disclosure will be described with reference to the accompanying drawings.

The disclosure provides a cooking apparatus capable of generating a summary video of a cooking process by identifying a change in a state of a cooking object through analysis of a video acquired during cooking of the cooking object and adding a sound suitable for the change in the state of the cooking object, and a method of controlling the same.

The cooking apparatus according to the disclosure and the method of controlling the same can generate a summary video of a cooking process by identifying a change in a state of a cooking object through analysis of a video acquired during cooking of the cooking object and adding a sound suitable for the change in the state of the cooking object.

The cooking apparatus according to the disclosure and the method of controlling the same can provide a user with a summary video into which a sound suitable for a change in a state of a cooking object is inserted. Since the user acquires auditory information as well as visual information from the summary video of the cooking process, the user can more easily identify the cooking process. Accordingly, the user's satisfaction can increase.

The technical objectives and effects of the disclosure are not limited to the above, and other objectives and effects may be clearly understood by those of ordinary skill in the art based on the following descriptions.

Figure 1:
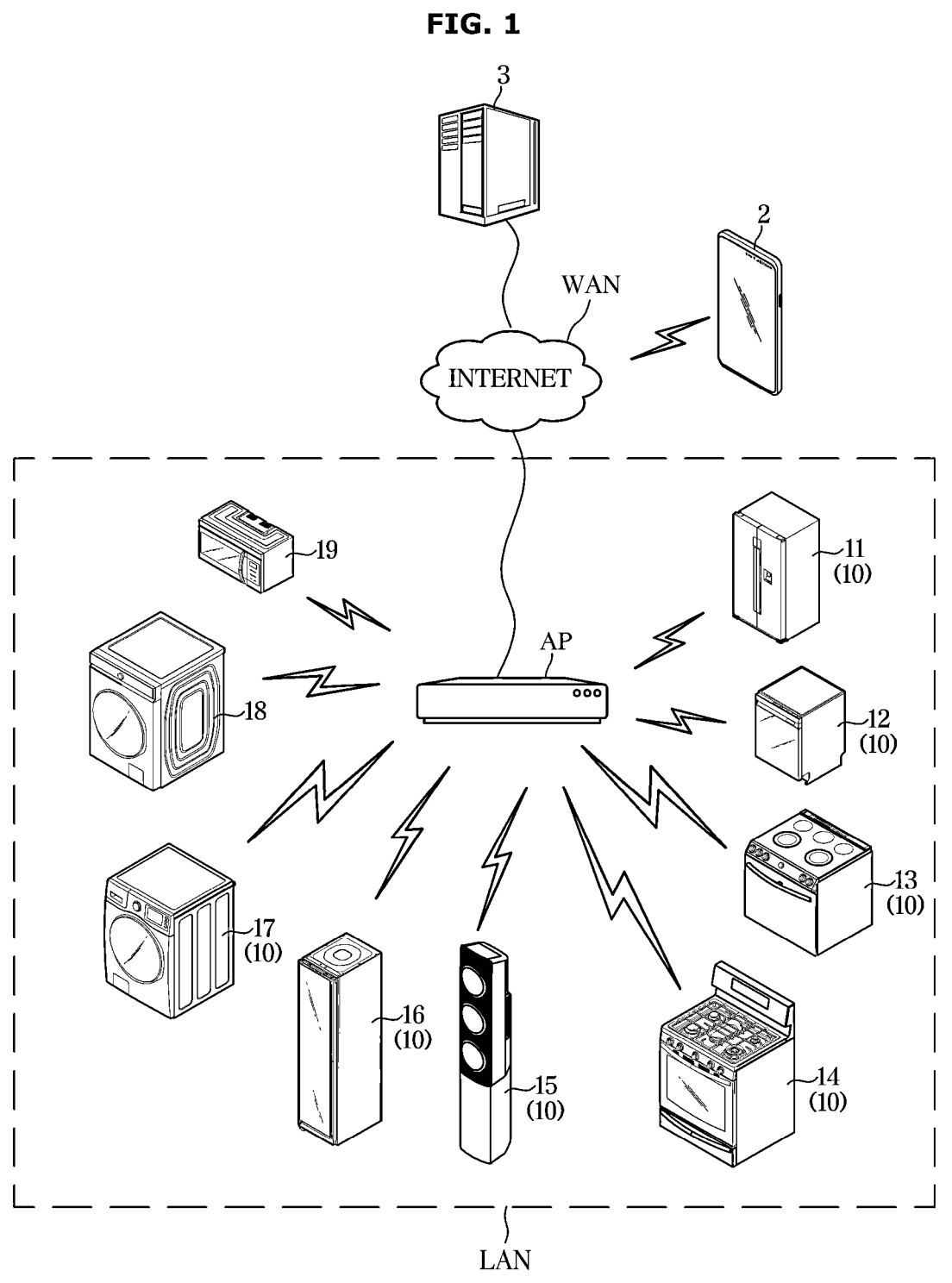

FIG. 1 illustrates a network system implemented by various electronic devices.

Referring to FIG. 1, a home appliance 10 may include a communication module for communicating with other home appliances, a user device 2 or a server 3, a user interface for receiving a user input or outputting information to a user, at least one processor for controlling the operation of the home appliance 10, and at least one memory in which a program for controlling the operation of the home appliance 10 is stored.

The home appliance 10 may be at least one of various types of home appliances. For example, the home appliances 10 may, as shown in the drawing, include at least one of a refrigerator 11, a dishwasher 12, an electric range 13, an electric oven 14, an air conditioner 15, a clothes care machine 16, a washing machine 17, a dryer 18, or a microwave oven 19, but is not limited thereto. The above-described home appliances are only examples, and in addition to the above-described home appliances, a device that may perform operations described below in connection with the other home appliances, the user device 2, or the server 3 may be included as an example of the home appliance 10 according to the example.

The server 3 may include a communication module for communicating with other servers, the home appliance 10 or the user device 2, at least one processor for processing data received from the other servers, the home appliance 10 or the user device 2, and at least one memory in which a program for processing data or the processed data is stored. The server 3 may be implemented as various computing devices, such as a workstation, a cloud, a data drive, a data station, and the like. The server 3 may be implemented as one or more servers that are physically or logically divided based on functions, detailed configurations of functions, or data, and may transmit and receive data through communication between each server and process the transmitted and received data.

The server 3 may perform functions, such as of managing a user account, registering the home appliance 10 to be associated with the user account, and managing or controlling the registered home appliance 10. For example, a user may access the server 3 through the user device 2 and generate a user account. A user account may be identified by an identifier (ID) and a password set by the user. The server 3 may register the home appliance 10 on a user account according to a predetermined procedure. For example, the server 3 may register, manage, and control the home appliance 10 by connecting identification information (e.g., a serial number or a media access control (MAC) address) of the home appliance 10 to a user account. The user device 2 may include a communication module for communicating with the home appliance 10 or the server 3, a user interface for receiving a user input or outputting information to the user, at least one processor for controlling the operation of the user device 2, and at least one memory in which a program for controlling the operation of the user device 2 is stored.

The user device 2 may be carried by the user or placed in the user's home or office. The user device 2 may include a personal computer, a terminal, a portable telephone, a smart phone, a handheld device, a wearable device, and the like, but is not limited thereto.

A program for controlling the home appliance 10, that is, an application, may be stored in the memory of the user device 2. The application may be sold in a state of being installed on the user device 2 or may be downloaded from an external server and installed.

The user may execute an application installed on the user device 2 to access the server 3 and generate a user account, and may perform communication with the server 3 based on the logged-in user account to register the home appliance 10.

For example, when the user manipulates the home appliance 10 such that the home appliance 10 is connected to the server 3 according to a procedure guided by an application installed in the user device 2, the server 3 may include identification information (e.g., a serial number or a MAC address) of the home appliance 10 in a corresponding user account, so that the home appliance 10 may be registered on the user account.

The user may control the home appliance 10 using an application installed on the user device 2. For example, when a user logs in to a user account with the application installed on the user device 2, the home appliance 10 registered on the user account is displayed, and when the user inputs a control command for the home appliance 10, the control command may be transmitted to the home appliance 10 through the server 3.

A network may include both a wired network and a wireless network. The wired network may include a cable network or a telephone network, and the wireless network may include any network that transmits and receives signals through radio waves. A wired network and a wireless network may be connected to each other.

The network may include a wide area network (WAN), such as the Internet, a local area network (LAN) formed around an access point (AP), and/or a short-range wireless network not using an AP. Short-range wireless networks may include, for example, Bluetooth™ (IEEE 802.15.1), Zigbee (IEEE 802.15.4), Wi-Fi Direct, near field communication (NFC), Z-Wave and the like, but are not limited thereto.

The AP may connect the home appliance 10 or the user device 2 to a WAN to which the server 3 is connected. The home appliance 10 or the user device 2 may be connected to the server 3 via a WAN.

The AP may use wireless communication, such as Wi-Fi™ (IEEE 802.11), Bluetooth (IEEE 802.15.1), Zigbee (IEEE 802.15.4), etc. to communicate with the user device 2 or the user device 2, and may use wired communication to access a WAN, but is not limited thereto.

According to various embodiments, the home appliance 10 may be directly connected to the user device 2 or the server 3 without using an AP.

The home appliance 10 may be connected to the user device 2 or the server 3 through a long-range wireless network or a short-range wireless network.

For example, the home appliance 10 may be connected to the user device 2 through a short-range wireless network (e.g., Wi-Fi Direct).

As another example, the home appliance 10 may be connected to the user device 2 or the server 3 through a WAN using a long-range wireless network (e.g., a cellular communication module).

As another example, the home appliance 10 may access a WAN using wired communication, and connect to the user device 2 or the server 3 through the WAN.

When the home appliance 10 is allowed to access a WAN using wired communication, the home appliance 10 may operate as an AP. Accordingly, the home appliance 10 may connect the other home appliances to the WAN to which the server 3 is connected. In addition, the other home appliances may connect the home appliance 10 to the WAN to which the server 3 is connected.

The home appliance 10 may transmit information about an operation or state to the other home appliances, the user device 2 or the server 3 through a network. For example, when a request is received from the server 3, or when a specific event occurs in the home appliance 10, or periodically or in real time, the home appliance 10 may transmit information about the operation or state to the other home appliances, the user device 2, or the server 3. The server 3 may, upon receiving the information about the operation or state of the home appliance 10, update stored information about an operation or state of the home appliance 10, and transmit the updated information about the operation and state of the home appliance 10 to the user device 2 through the network. Here, updating information may include various operations of changing existing information, such as adding new information to existing information or replacing existing information with new information.

The home appliance 10 may acquire various types of information from the other home appliances, the user devices 2 or the server 3 and provide the acquired information to the user. For example, the home appliance 10 may receive information (e.g., a cooking method, a laundry method, etc.), related to functions of the home appliance 10 from the server 3 and various types of environmental information (e.g., a weather, a temperature, a humidity, etc.), and may output the acquired information through a user interface.

The home appliance 10 may operate according to a control command received from the other home appliances, the user device 2, or the server 3. For example, the home appliance 10 may, even without a user input, upon acquiring a user's prior approval to operate according to a control command of the server 3, operate according to a control command received from the server 3. Here, the control command received from the server 3 may include a control command input by a user through the user device 2 or a control command based on a preset condition, but is not limited thereto.

The user device 2 may transmit information about the user to the home appliance 10 or the server 3 through the communication module. For example, the user device 2 may transmit information about the user's location, the user's health condition, the user's taste, and the user's schedule to the server 3. The user device 2 may transmit the information about the user to the server 3 according to a user's prior approval.

The home appliance 10, the user device 2, or the server 3 may determine a control command using artificial intelligence and other technologies. For example, the server 3 may receive information about the operation or state of the home appliance 10 or receive information about the user of the user device 2, and process the received information using technology such as artificial intelligence, and then transmit a processing result or a control command to the home appliance 10 or the user device 2.

A cooking apparatus 1 described below corresponds to the home appliance 10 having been described above.

Figure 3:
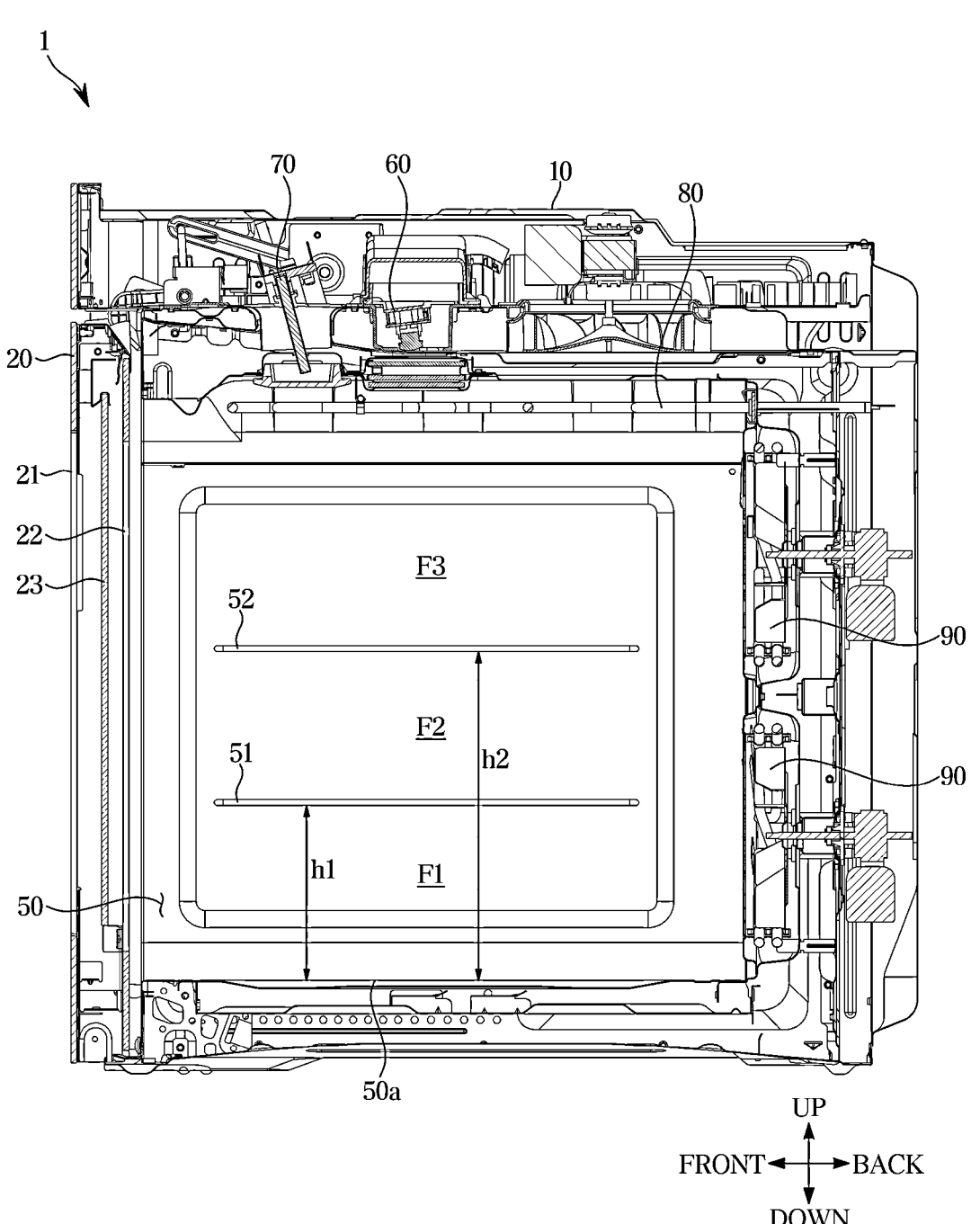
FIG. 3 is a cross-sectional view illustrating a cooking apparatus according to an embodiment.
Figure 4:
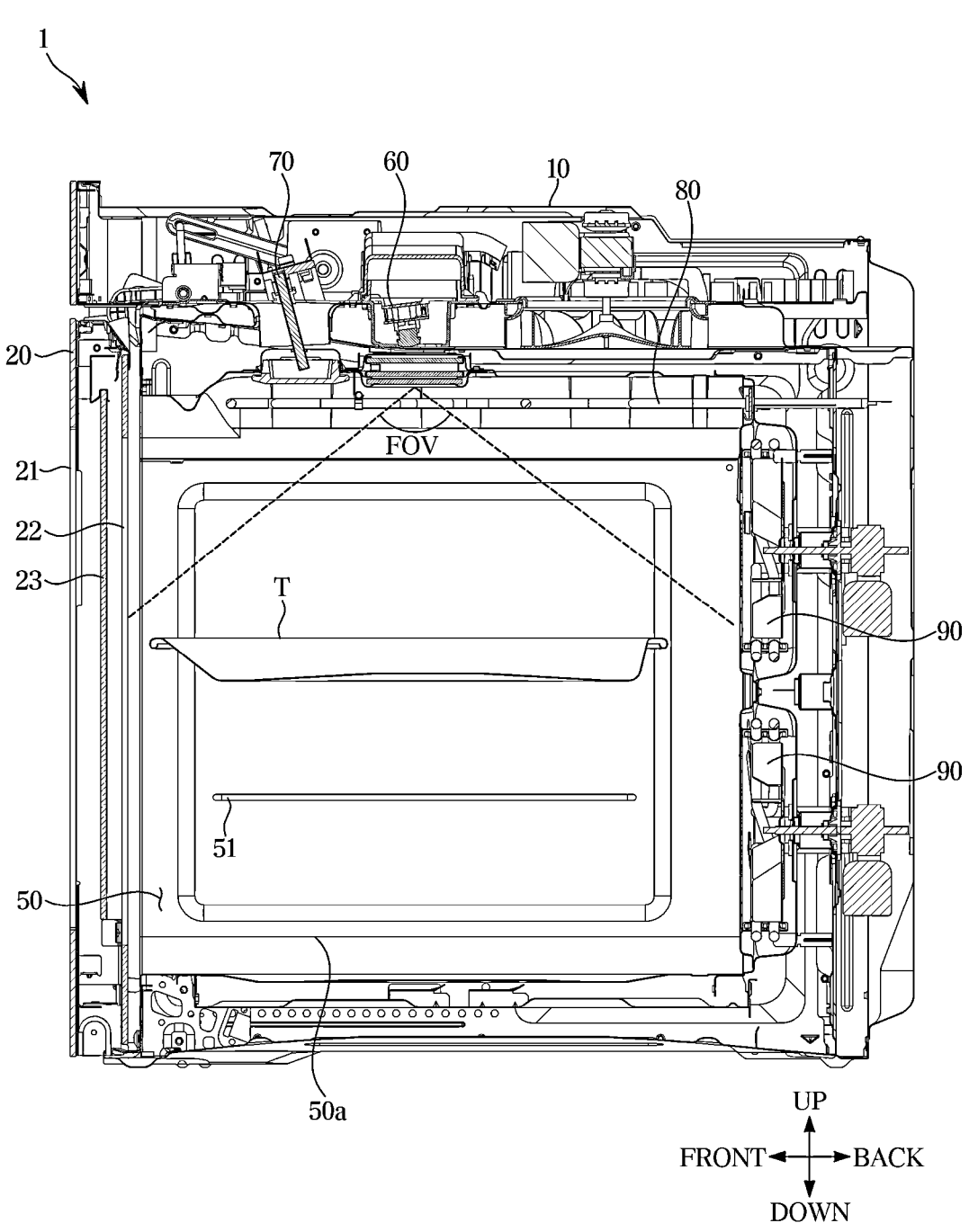
FIG. 4 illustrates an example in which a tray is mounted on a first support on a sidewall of a chamber.

FIG. 2 is a perspective view illustrating a cooking apparatus according to an embodiment. FIG. 3 is a cross-sectional view illustrating a cooking apparatus according to an embodiment. FIG. 4 illustrates an example in which a tray is mounted on a first support on a sidewall of a chamber.

Referring to FIGS. 2, 3, and 4, the cooking apparatus 1 may include a housing 1h forming the external appearance and a door 20 provided to open and close an opening of the housing 1h. The door 20 may include at least one transparent glass plate 21. For example, the door 20 may include a first transparent glass plate 21 forming an outer surface of the door 20 and a second transparent glass plate 22 forming an inner surface of the door 20. In addition, a third transparent glass plate 23 may be disposed between the first transparent glass plate 21 and the second transparent glass plate 22. Although the door 20 has been illustrated as including a triple transparent glass plate, it is not limited thereto. The door 20 may include a double transparent glass plate or a quadruple transparent glass plate.

The at least one transparent glass plate 21, 22, and 23 included in the door 20 may serve as a window. When the door 20 is closed, the user may observe the inside of the chamber 50 through the transparent glass plates 21, 22, and 23. The transparent glass plates 21, 22 and 23 may be formed of heat-resistant glass.

On the housing 1h of the cooking apparatus 1, a user interface 40 for displaying information related to the operation of the cooking apparatus 1 and acquiring a user input may be provided. The user interface 40 may include a display 41 for displaying information related to the operation of the cooking apparatus 1 and an inputter 42 for acquiring a user's input. The display 41 and the inputter 42 may be provided in various positions of the housing 1h. For example, the display 41 and the inputter 42 may be located on an upper front side of the housing 1h.

The display 41 may be provided as various types of display panels. For example, the display 41 may include a liquid crystal display (LCD) panel, a light emitting diode (LED) panel, an organic light emitting diode (OLED) panel, or a micro LED panel. The display 41 may also be used as an input device by including a touch screen.

The display 41 may display information input by the user or information provided to the user in various screens. The display 41 may display information related to the operation of the cooking apparatus 1 as at least one of images or text. In addition, the display 41 may display a graphic user interface (GUI) enabling control of the cooking apparatus 1. That is, the display 41 may display a user interface (UI) element, such as an icon.

The inputter 42 may transmit an electrical signal (a voltage or current) corresponding to a user input to the controller 200. The inputter 42 may include various buttons and/or dials. For example, the inputter 42 may include at least one of a power button for turning on or off the power of the cooking apparatus 1, a start/stop button for starting or stopping a cooking operation, a cooking course button for selecting a cooking course, a temperature button for setting a cooking temperature, and a time button for setting a cooking time. Various buttons may be provided as physical buttons or touch buttons.

A dial included in the inputter 42 may be rotatably provided. One of a plurality of cooking courses may be selected by rotating the dial. As the dial rotates, UI elements displayed on the display 41 may sequentially move. The cooking apparatus 1 may perform cooking according to a selected cooking course. The cooking course may include cooking parameters, such as a cooking temperature, a cooking time, an output of a heater 80, and an output of a fan 90. Different cooking courses may be selected according to the position of a tray T in a chamber 50, the type of a cooking object, and the quantity and/or size of a cooking object.

The cooking apparatus 1 may include a chamber 50 provided inside the housing 1*h* and in which a cooking object may be placed. An opening may be provided on the front side of the housing 1*h*. A user may place a cooking object inside the chamber 50 through the opening of the housing 1*h*. The chamber 50 may be provided in a rectangular parallelepiped shape.

A plurality of supports 51 and 52 for mounting the tray T may be provided on both sidewalls of the chamber 50. The support may be referred to as a "rail". For example, the plurality of supports 51 and 52 may be formed to protrude from a left inner wall and a right inner wall of the chamber 50. As another example, the plurality of supports 51 and 52 may be provided as separate structures to be mountable on the left inner wall and the right inner wall of the chamber 50.

Each of the plurality of supports 51 and 52 has a predetermined length in the front-back direction. The plurality of supports 51 and 52 may be provided at positions spaced apart from each other in the upper-lower direction. For example, the plurality of supports 51 and 52 may include a first support 51 and a second support 52 formed at a position higher than the position of the first support 51. The first support 51 may be located at a first height h1 from a bottom 50*a* of the chamber 50. The second support 52 may be located at a second height h2 higher than the first height h1 from the bottom 50*a* of the chamber 50.

The first support 51 may refer to a pair of supports located at the first height on each of the left inner wall and the right inner wall of the chamber 50. The second support 52 may refer to a pair of supports located at the second height om each of the left inner wall and the right inner wall of the chamber 50. The space within the chamber 50 may be divided into a plurality of floors by the plurality of supports

51 and 52. For example, the bottom 50*a* of the chamber 50 may form a first floor F1, the first support 51 may form a second floor F2, and a second support 52 may form a third floor F3.

The tray T may be mounted at various heights within the chamber 50 by the plurality of supports 51 and 52. For example, the tray T may be mounted on the bottom 50*a* of the chamber 50, the first support 51, or the second support 52. In a state in which the tray T is put into the chamber 50, an upper surface of the tray T may face the ceiling of the chamber 50. A cooking object may be placed on the upper surface of the tray T. The tray T may have various shapes. For example, the tray T may be provided in a rectangular or circular shape.

When a plurality of trays are mounted at the same time, a plurality of cooking zones may be formed. For example, when a plurality of trays are mounted on all of the bottom 50*a*, the first support 51 and the second support 52 of the chamber 50, a first floor zone, a second floor zone, and a third floor zone may be formed in the chamber 50.

Each sidewall of the chamber 50 has been illustrated as having two supports 51 and 52 at different heights, but it is not limited thereto. Depending on the design, various numbers of rails may be provided. As the chamber 50 is larger, a larger number of rails may be provided.

Various parts required for the operation of the cooking apparatus 1 may be disposed between the chamber 50 and the housing 1*h*. For example, the cooking apparatus 1 may include a camera 60, a lighting 70, a fan 90, and various circuits.

The camera 60 may acquire an image of the inside of the chamber 50. The camera 60 may transmit data of the acquired image to the controller 200. The camera 60 may include a lens and an image sensor. In order to secure a field of view (FOV) of the camera 60, a portion of an upper surface of the chamber 50 adjacent to the position of the camera 60 may be formed of a transparent material (e.g., a transparent heat-resistant glass). The location of the camera 60 is not limited to the top of the chamber 50. The camera 60 may be provided within chamber 50.

The lighting 70 may emit light into the chamber 50. The interior of the chamber 50 may be illuminated by the light emitted from the lighting 70. Accordingly, the brightness, contrast, and/or sharpness of an image acquired by the camera 60 may be increased, and the identification of an object included in the image may be improved. A diffusion material for transmitting and diffusing light of the lighting 70 into the chamber 50 may be provided on another portion of the upper surface of the chamber 50 adjacent to the position of the lighting 70.

A heater 80 may be positioned on the upper end of the chamber 50. The heater 80 may supply heat to the inside of the chamber 50. A cooking object may be cooked by the heat generated by the heater 80. The heater 80 may be provided as one or more heaters. The heating level and heating time of the heater 80 may be adjusted by the controller 200. The output and heating time of the heater 80 may be adjusted to be different according to the position of the tray T in the chamber 50, the type of a cooking object, and the quantity and/or size of a cooking object. That is, the operation of the heater 80 may be controlled to vary according to the cooking course.

The fan 90 may circulate air inside the chamber 50. The fan 90 may include a motor and a blade. The fan 90 may be provided as one or more fans. As the fan 90 operates, air heated by the heater 80 may circulate inside the chamber 50. Therefore, heat generated by the heater 80 may be evenly transferred from the top to the bottom of the chamber 50. The rotation speed and rotation time of the fan 90 may be controlled by the controller 200. The operation of the fan 90 may be controlled to be different according to the cooking course. Depending on the position of the tray Tin the chamber 50, the type of a cooking object, and the quantity and/or size of a cooking object, the output and rotation time of the fan 90 may be adjusted differently.

Figure 5:
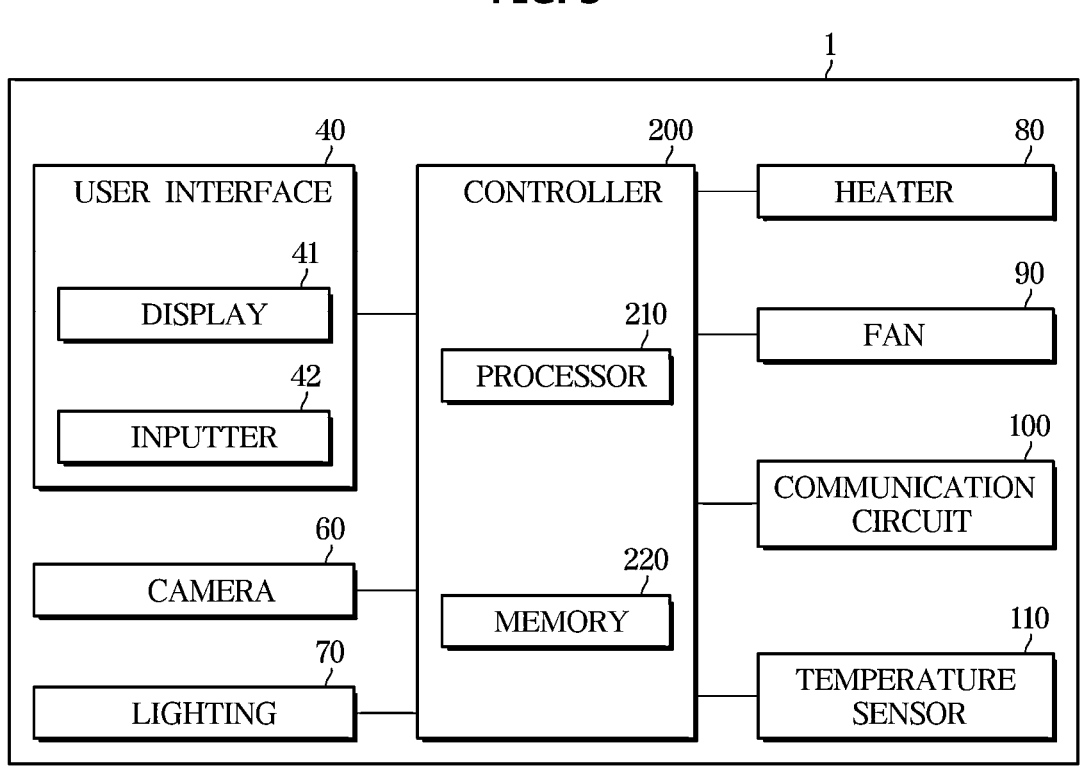
FIG. 5 illustrates control components of a cooking apparatus according to an embodiment.

FIG. 5 illustrates control components of a cooking apparatus according to an embodiment.

Referring to FIG. 5, the cooking apparatus 1 may include a user interface 40, a camera 60, a lighting 70, a heater 80, a fan 90, a communication circuit 100, a temperature sensor 110, and a controller 200. The controller 200 may be electrically connected to the components of the cooking apparatus 1 and control the components of the cooking apparatus 1.

The user interface 40 may include a display 41 and an inputter 42. The display 41 may display information related to the operation of the cooking apparatus 1. The display 41 may display information input by the user or information provided to the user in various screens.

The inputter 42 may acquire a user input. The user input may include various commands. For example, the inputter 42 may acquire at least one type of command among a command to select an item, a command to select a cooking course, a command to adjust a heating level of the heater 80, a command to adjust a cooking time, a command to adjust a cooking temperature, a cooking start command and a cooking stop command. The user input may be acquired from the user device 2.

The controller 200 may process a command received through at least one of the inputter 42 and the user device 2 to control the operation of the cooking apparatus 1. The cooking apparatus 1 may automatically perform cooking based on cooking course information acquired from the memory 220, the user device 2, or the server 3.

The camera 60 may acquire an image of the inside of the chamber 50. The camera 60 may have a predetermined FOV. The camera 60 may be located on the upper side of the chamber 50 and may have an FOV directed from the upper side of the chamber 50 to the inside of the chamber 50. The controller 200 may control the camera 60 to acquire an image of the inside of the chamber 50 in response to the door 20 being closed subsequent to the cooking apparatus 1 being powered on. The controller 200 may control the camera 60 to acquire an image of the inside of the chamber 50 at predetermined time intervals from the start of cooking to the end of cooking. That is, the controller 200 may control the camera 60 to acquire a plurality of image frames while a cooking object is being cooked. The controller 200 may identify a change in a state of the cooking object from the plurality of image frames.

The lighting 70 may emit light into chamber 50. The controller 200 may control the lighting 70 to emit light in response to the cooking apparatus 1 being powered on. The controller 200 may control the lighting 70 to emit light until cooking is completed or until the cooking apparatus 1 is powered off.

The heater 80 may supply heat to the inside of the chamber 50. The controller 200 may adjust the output of the heater 80. For example, the controller 200 may adjust the heating level and heating time of the heater 80. The controller 200 may adjust the heating level and heating time of the heater 80 according to the position of the tray T in the chamber 50, the property of a cooking object, and/or the cooking course.

The fan 90 may circulate air inside the chamber 50. The controller 200 may adjust the output of the fan 90. For example, the controller 200 may adjust the rotation speed and rotation time of the fan 90. The controller 200 may adjust the rotation speed and rotation time of the fan 90 according to the position of the tray T in the chamber 50 and the type, quantity, number and/or size of the cooking object.

The communication circuit 100 may perform a connection with at least one of the user device 2 and the server 3 through a network. The controller 200 may acquire various types of information, various signals, and/or various data from the server 3 through the communication circuit 100. For example, the communication circuit 100 may receive a remote control signal from the user device 2. The controller 200 may acquire a learning model, which is used to analyze an image, from the server 3 through the communication circuit 100.

The communication circuit 100 may include various communication modules. The communication circuit 100 may include a wireless communication module and/or a wired communication module. As a wireless communication technology, wireless local area network, home radio frequency (RF), infrared communication, ultra-wide band (UWB) communication, Wi-Fi, Bluetooth, Zigbee, and the like may be applied.

The temperature sensor 110 may detect the temperature inside the chamber 50. The temperature sensor 110 may be installed in various locations inside the chamber 50. The temperature sensor 110 may transmit an electrical signal corresponding to the detected temperature to the controller 200. The controller 200 may control at least one of the heater 80 and the fan 90 such that the temperature inside the chamber 50 is maintained at a cooking temperature determined according to the type, number, and/or cooking course of a cooking object.

In addition, the cooking apparatus 1 may include various sensors. For example, the cooking apparatus 1 may include a current sensor and a voltage sensor. The current sensor may measure currents applied to electronic components of the cooking apparatus 1. The voltage sensor may measure voltages applied to electronic components of the cooking apparatus 1.

The controller 200 may include a processor 210 and a memory 220. The processor 210, i.e., hardware, may include a logic circuit and an arithmetic circuit. The processor 210 may control electrically connected components of the cooking apparatus 1 using programs, instructions, and/or data stored in the memory 220 for operations of the cooking apparatus 1. The controller 200 may be implemented as a control circuit including circuit elements, such as capacitors, inductors, and resistance elements. The processor 210 and the memory 220 may be implemented as separate chips or as a single chip. In addition, the controller 200 may include a plurality of processors and a plurality of memories.

The memory 220 may store programs, applications, and/or data for operations of the cooking apparatus 1 and may store data generated by the processor 210. For example, the memory 220 may store a sound matching table including sound information matching with a property of the cooking object and a change in a state of the cooking object.

The memory 220 may include non-volatile memories, such as a read only memory (ROM) and a flash memory for long-term storage of data. The memory 220 may include volatile memories, such as a static random access memory (S-RAM) and a dynamic random access memory (D-RAM) for temporarily storing data.

The controller 200 may identify various objects included in a plurality of image frames acquired by the camera 60. The controller 200 may identify a cooking object included in the image frame. The controller 200 may identify a cooking object from a plurality of image frames and estimate a property of the cooking object using a learning model acquired from the memory 220 or the server 3. The property of the cooking object may include the type, quantity, number, and/or size of the cooking object. When a plurality of cooking objects are present, the controller 200 may identify properties of the plurality of cooking objects.

The controller 200 may analyze a plurality of image frames to identify a change in the state of the cooking object, and extract a portion of image frames from among the plurality of image frames based on the change in the state of the cooking object. The controller 200 may add a sound corresponding to the change in the state of the cooking object to the extracted portion of image frames to generate a summary video of the cooking process. In addition, the controller 200 may insert metadata including time information, cooking object state information, and sound information into each of the images frames of the extracted portion.

The controller 200 may identify a change in a state of a cooking object from a plurality of image frames acquired by the camera 60. In addition, the controller 200 may determine the amount of the change in the state of the cooking object. The controller 200 may determine the amount of the change in the state of the cooking object by comparing image frames acquired at different points in time. For example, the controller 200 may compare a reference image frame transmitted from the server 3 with each of a plurality of image frames acquired by the camera 60 while a cooking object is being cooked. As another example, the controller 200 may set an image frame acquired by the camera 60 at a start of cooking as a reference image frame and compare the reference image frame with image frames acquired thereafter. As another example, the controller 200 may convert an image frame acquired by the camera 60 at each specific point in time during cooking to a reference image frame, and compare image frames acquired thereafter with the reference image frame. In other words, the controller 200 may set an image frame acquired at a time n−1 as a reference image frame and compare the image frame with an image frame acquired at a time n.

The controller 200 may identify the change in the state of the cooking object by detecting at least one of a change in the size of the cooking object, a change in the shape of the cooking object, a change in the color of the cooking object, and a change in the texture of the cooking object, and may determine the amount of the change in the state of the cooking object. The amount of the change in the state of the cooking object may include at least one of the amount of the change in the size of the cooking object, the amount of the change in the shape of the cooking object, the amount of the change in the color of the cooking object, and the amount of the change in the texture of the cooking object. Through comparison between image frames acquired at different points in time, at least one of a change in the size of the cooking object, a change in the shape of the cooking object, a change in the color of the cooking object, and a change in the texture of the cooking object may be detected.

The controller 200 may divide a raw video generated by the plurality of image frames into a plurality of sections based on the change in the state of the cooking object. The controller 200 may extract at least one image frame from each of the divided plurality of sections to acquire a portion of image frames. For example, the controller 200 may detect a phase-change section (or phase-change inverval) in which the slope of the amount of the change in the state of the cooking object is greater than or equal to a predetermined threshold, and divide the raw video into a plurality of sections based on a starting point and an ending point of the phase-change section (or phase-change inverval).

In addition, the controller 200 may detect a phase-holding part in which the slope of the amount of the change in the state of the cooking object remains less than the threshold value. The controller 200 may divide the raw video into a plurality of sections based on the phase-holding section (or phase-holding inverval) in which the slope of the amount of the change in the state of the cooking object remains less than the threshold value. The controller 200 may determine the phase-holding section (or phase-holding inverval) as one section. When the slope of the amount of the change in the state of the cooking object remains less than the threshold value for a predetermined time or more, the controller 200 may determine the corresponding time interval as the phase-holding section. In other words, the controller 200 may, in response that the length of time during which the slope of the amount of the change in the state of the cooking object remains less than the threshold value is longer than or equal to a predetermined threshold time, determine, as one section, the phase-holding section in which the slope of the amount of the change in the state of the cooking object remains less than the threshold value.

The controller 200 may determine a sound to be added to each of the plurality of sections using a sound matching table stored in the memory 220. When the change in the state of the cooking object is different in each of the divided plurality of sections, the controller 200 may add a different sound to each of the divided plurality of sections.

When a plurality of cooking objects are present, the controller 200 may synthesize a plurality of sounds matching with properties of the plurality of cooking objects and changes of states of the plurality of cooking objects to generate a harmonious sound. The controller 200 may add the harmonious sound to the extracted portion of image frames to generate a summary video of the cooking process. In addition, the controller 200 may determine the volume of each of the plurality of sounds to be different based on the property of each of the plurality of cooking objects.

Components of the cooking apparatus 1 are not limited to those described above. The cooking apparatus 1 may further include various components in addition to the above components, and some of the above components may be omitted.

Figure 6:
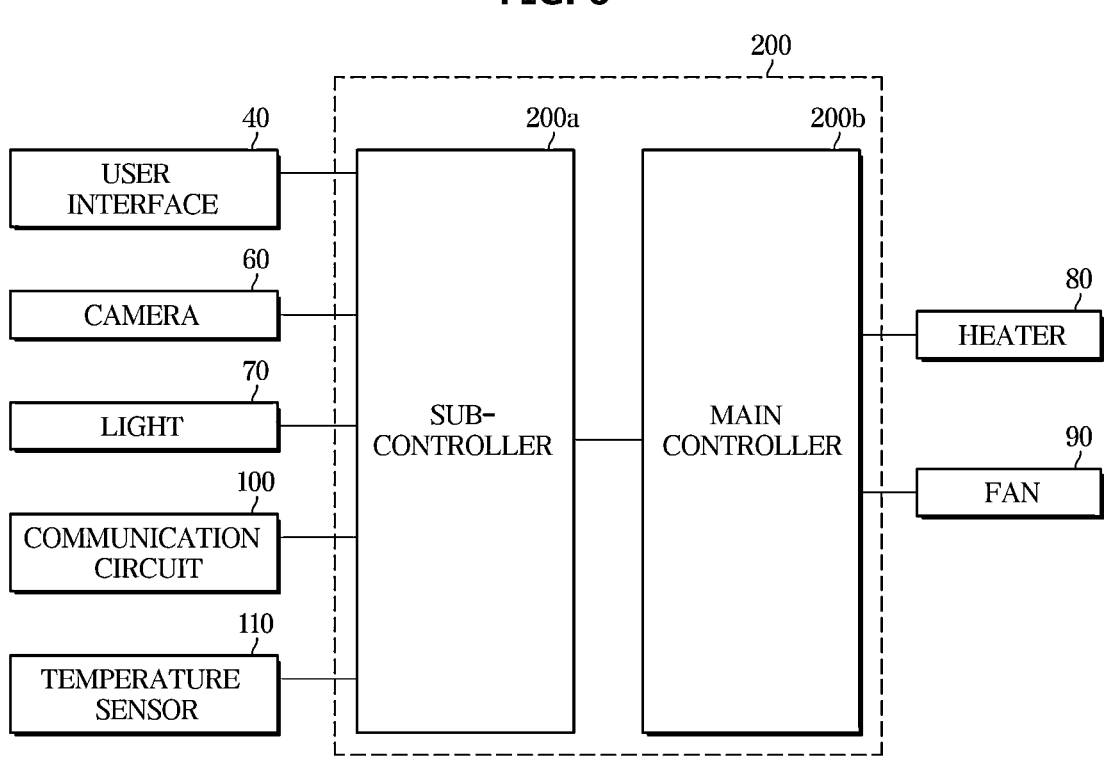
FIG. 6 illustrates the structure of a controller described in FIG. 5.

FIG. 6 illustrates the structure of the controller described in FIG. 5.

Referring to FIG. 6, the controller 200 may include a sub-controller 200a and a main controller 200b. The sub-controller 200a and the main controller 200b may be electrically connected to each other, and each may include a separate processor and a separate memory. The main controller 200b may be electrically connected to the heater 80 and the fan 90 and may control the operation of the heater 80 and the fan 90.

The sub-controller 200a may control operations of the user interface 40, the camera 60, the lighting 70, the communication circuit 100, and the temperature sensor 110. The sub-controller 200a may process an electrical signal corresponding to a user input inputted through the user interface 40 and control the user interface 40 to display information about the operation of the cooking apparatus 1.

The sub-controller 200a may acquire a learning model and a reference image used for identifying a cooking object, estimating the property of the cooking object, and identifying a change in a state of the cooking object from the server 3. The sub-controller 200a may pre-process images, identify a cooking object using the learning model, and estimate the property of the cooking object (the type, the number and/or the size of the cooking object). Each of a plurality of image frames acquired by the camera 60 may be input to the learning model. The learning model may output the type, number, and/or size of the cooking object included in the image frames.

In addition, the sub-controller 200a may identify a change in a state of the cooking object by analyzing the plurality of image frames acquired by the camera 60. The sub-controller 200a may identify a change in a state of the cooking object by comparing the reference image frame with each of the plurality of image frames. The sub-controller 200a may determine the amount of the change in the state of the cooking object by comparing image frames acquired at different points. The sub-controller 200a may extract a portion of image frames among the plurality of image frames based on the change in the state of the cooking object. The sub-controller 200a may add a sound corresponding to the change in the state of the cooking object to the extracted portion of image frames to generate a summary video of the cooking process.

The learning model refers to an artificial intelligence model. The learning model may be generated through machine learning and/or deep learning. The learning model may be generated by the server 3 and stored in the memory 220 of the cooking apparatus 1. A learning algorithm may include, for example, supervised learning, unsupervised learning, semi-supervised learning, or reinforcement learning, and is limited to the exemplified examples.

The learning model may include a plurality of artificial neural network layers. Artificial neural networks may include deep neural networks (DNNs), convolutional neural networks (CNNs), recurrent neural networks (RNNs), restricted boltzmann machines (RBMs), deep belief networks (DBNs), bidirectional recurrent deep neural networks (BRDNNs), and/or deep Q-networks, but are not limited thereto. The artificial intelligence model may include, additionally or alternatively, a software structure in addition to a hardware structure.

The sub-controller 200a may include a special processor for performing a multi-input-multi-output operation (i.e., a matrix operation) to process an artificial intelligence algorithm. The special processor included in the sub-controller 200a may be referred to as a neural process unit (NPU).

FIG. 7 is a table for describing a change in a state of a cooking object over time. FIG. 8 illustrates a graph showing the amount of the change in the state of the cooking object described with reference to FIG. 7 and waveforms of sound added to a plurality of sections classified according to the change in the state of the cooking object.

Referring to a table 700 shown in FIG. 7, the state of a cooking object may change over time after cooking starts. The change in the state of the cooking object may be divided into several phases. When the cooking object is bread, dough may be initially put into the chamber 50. In Phase 1, the dough may be heated to a certain temperature. Phase 1 may correspond to a first time interval from a time to, which is a start of cooking, to a time t1. In Phase 1, the change in the dough may not be great, and comparing the size of the dough at a time t0 with the size of the dough at a time t1 may represent the amount of the change in the state of the cooking object as 5.

In Phase 2, the size and shape of the dough may change rapidly, and the shape of bread intended by the user may be achieved. Phase 2 may correspond to a second time interval from a time t1 to a time t2. The time length of Phase 2 may be shorter than that of Phase 1. That is, the size and shape of the dough may change rapidly within a short period of time. Comparing the size of the dough at a time t0 with the size of the dough at time t2 may represent the amount of the change in the state of the cooking object in Phase 2 as 30.

In Phase 3, the change in the size and shape of the bread may be small, and the size and shape of the bread in Phase 3 may be similar to the final size and shape. Phase 3 may correspond to a third time interval from a time t2 to a time t3. The time length of Phase 3 may be longer than that of Phase 2. Comparing the size of the dough at a time t0 with the size of the bread at a time t3 may represent the amount of the change in the state of the cooking object in Phase 3 as 35.

In Phase 4, the color of the bread may change rapidly. Phase 4 may correspond to a fourth time interval from a time t3 to a time t4. The time length of Phase 4 may be shorter than that of Phase 2. Comparing the size and color of the dough at a time t0 with the size and color of bread at time t3 may represent the amount of the change in the state of the cooking object in Phase 4 as 50.

In Phase 5, the change in the color of the bread may be small, and the bread may be finished at a time t5 when Phase 5 ends. Phase 5 may correspond to a fifth time interval from a time t4 to a time t5. The time length of Phase 5 may be longer than that of Phase 4 and shorter than that of Phase 3. Comparing the size and color of the dough at a time t0 and the size and color of the bread at a time t5 may represent the amount of the change in the state of the cooking object in Phase 5 as 55.

The amount of the change in the state of the cooking object represented in each phase of the table 700 may be calculated by the controller 200 and displayed as a numerical value. The amount of the change in the state of the cooking object may be acquired in various formats, for example, as a percentage value.

The above description has been made in relation that, in order to acquire the amount of the change in the state of the cooking object, the state of the cooking object at a time to, which is the start of cooking, is compared with the state of the cooking object at the end of each phase, but the disclosure is not limited thereto. For example, in order to acquire the amount of the change in the state of the cooking object, the state of the cooking object at the start of each phase may be compared with the state of the cooking object at the end of each phase.

On the other hand, the change in a state of a cooking object may be provided in different aspects depending on the type of the cooking object. For example, when the cooking object is meat, the state change of the meat may be insignificant in Phase 1. In Phase 2, the size and shape of the meat may change rapidly as moisture and oil are extracted from the meat. In Phase 3, the state change of the meat may not be significant, and in Phase 4, the color of the meat may change rapidly. In Phase 5, the state change of the meat may be insignificant, and the final state desired by the user may be achieved.

The cooking apparatus 1 may identify different state changes for each type of a cooking object by analyzing a plurality of image frames acquired by the camera 60. The controller 200 of the cooking apparatus 1 may identify that the state of the cooking object (e.g., bread) changes through five phases described with reference to FIG. 7 from the plurality of image frames acquired during cooking. The controller 200 may identify the change in the state of the cooking object by comparing a reference image frame (e.g., an image frame acquired at a time t0) with each of the plurality of image frames.

The controller 200 may detect a phase-change section in which the slope of the amount of the change in the state of the cooking object is greater than or equal to a predetermined threshold value. Referring to a graph 800 shown in FIG. 8, in the second time interval from a time t1 to a time t2 and the fourth time interval from a time t3 to a time t4, the slope of the amount of the change in the state of the cooking state is greater than the slope of the amount of the change in the state of the cooking state in the other time intervals. In the second time interval and the fourth time interval, the slope of the amount of the change in the state of the cooking state may be greater than or equal to a predetermined threshold value. The controller 200 may detect the second time interval and the fourth time interval as phase-change intervals.

In addition, the controller 200 may detect a phase-holding section in which the slope of the amount of the change in the state of the cooking object remains less than the threshold value. When the slope of the amount of the change in the state of the cooking object remains less than the threshold value for a predetermined time or more, the controller 200 may determine the corresponding time interval as a phase-holding section. In other words, the controller 200 may, in response that the length of time during which the slope of the amount of the change in the state of the cooking object remains less than the threshold value is longer than or equal to a predetermined threshold time, determine, as one section, the phase-holding section in which the slope of the amount of the change in the state of the cooking object remains less than the threshold value. Referring to the graph 800 shown in FIG. 8, the first time interval from a time t0 to a time t1, the third time interval from a time t2 to a time t3, and the fifth time interval from a time t4 to a time t5 may correspond to phase-holding sections.

The controller 200 may divide the raw video into a plurality of sections based on the starting time and the ending time of the phase-change section. In addition, the controller 200 may also divide the raw video into a plurality of sections based on a phase-holding section in which the slope of the amount of the change in the state of the cooking object remains less than the threshold value. The controller 200 may divide the raw video into a plurality of sections based on at least one of a phase-change section and a phase-holding section.

A raw video is a sequence of a plurality of image frames arranged over time. In FIG. 8, the raw video may be divided into five sections based on the points in time t1, t2, t3, and t4. That is, the raw video may include a first section S1 from a time t0 to a time t1, a second section S2 from a time t1 to a time t2, a third section S3 from a time t2 to a time t3, a fourth section S4 from a time t3 to a time t4, and a fifth section S5 from a time t4 to a time t5.

Comparing FIGS. 7 and 8 shows that the first section S1 includes image frames corresponding to Phase 1, the second section S2 includes image frames corresponding to Phase 2, the third section S3 includes image frames corresponding to Phase 3, the fourth section S4 includes image frames corresponding to Phase 4, and the fifth section S5 includes image frames corresponding to Phase 5. That is, image frames belonging to different time intervals may be divided into different sections. The controller 200 may extract at least one image frame from each of the divided plurality of sections S1, S2, S3, S4, and S5. With such a configuration, a portion of image frames among the plurality of image frames constituting the raw video may be extracted.

As described in FIG. 7, the change in a state of a cooking object may be provided in various aspects during a process of cooking the cooking object. In practice, various sounds may be generated depending on the state of the cooking object. For example, when meat is cooked on a wire rack (or a grill), in the initial period (e.g. Phase 1) of the cooking process, a change in the state of the meat is insignificant and no special sound may be generated. In the middle period of the cooking process (e.g., Phases 2 and 3), moisture and oil may escape from the meat and hit the bottom 50a of the chamber 50, and the moisture and oil may be evaporated by heat, generating a sound. In the last period of the cooking process (e.g., Phases 4 and 5), the sound of oil boiling on the surface of the meat may occur.

The controller 200 of the cooking apparatus 1 may generate a summary video of the cooking process by synthesizing the extracted image frames with sounds that match with the property of the cooking object and the change in the state of the cooking object. The controller 200 may add a sound to each of the plurality of sections S1, S2, S3, S4, and S5. The controller 200 may determine the sound to be added to each of the plurality of sections S1, S2, S3, S4, and S5 using the sound matching table stored in the memory 220. When the change in the state of the cooking object is different for each of the divided plurality of sections S1, S2, S3, S4, and S5, the controller 200 may add a different sound to each of the divided plurality of sections S1, S2, S3, S4, and S5. The sound waveforms of FIG. 8 show that the sounds respectively added to the first section S1, the second section S2, the third section S3, the fourth section S4, and the fifth section S5 are different from each other. For example, a white sound may be added to the first section S1, the third section S3, and the fifth section S5, which are phase-holding sections.

FIG. 9 illustrates a sound matching table according to an embodiment.

Referring to FIG. 9, a sound matching table 900 may include sound information that matches with a property of the cooking object and a change in a state of the cooking object. The sound matching table 900 may be stored in the memory 220 when the cooking apparatus 1 is produced. The sound matching table 900 may be downloaded from the server 3 and stored in the memory 220. The sound matching table 900 may be updated.

As described above, the property of the cooking object may include the type, quantity, number and/or size of the cooking object. The change in the state of the cooking object may vary depending on the property of the cooking object, and also generate various sounds as the state of the cooking object changes. The sound matching table 900 may include sound information suitable for properties and states of various cooking objects.

In the case of meat and fish, a white sound, a grilling sound, an oil splashing sound, a popping sound, and/or an evaporation sound may be suitable depending on the cooking state. In the case of fried food, a white sound, an oil splashing sound, and/or an evaporation sound may be suitable depending on the cooking state. In the case of pizza, a white sound, a grilling sound, a sizzling sound, and/or an evaporation sound may be suitable depending on the cooking state. In the case of soup and stew, a white sound and/or a liquid boiling sound may be suitable depending on the cooking state. In the case of bread, a white sound may be suitable throughout the entire cooking process.

When a plurality of cooking objects are present, the controller 200 may synthesize a plurality of sounds that match with the properties of the cooking objects and the changes in state of the cooking objects to generate a harmonious sound. The controller 200 may add the generated harmonious sound to the extracted portion of image frames to generate a summary video of the cooking process. In addition, the controller 200 may adjust the volume of each of the plurality of sounds to be different based on the properties of the plurality of cooking objects. For example, when meat and vegetable are cooked together, the controller 200 may increase the volume of a sound matching with a cooked state of the meat and decrease the volume of a sound matching with a cooked state of the vegetable.

Figure 10:
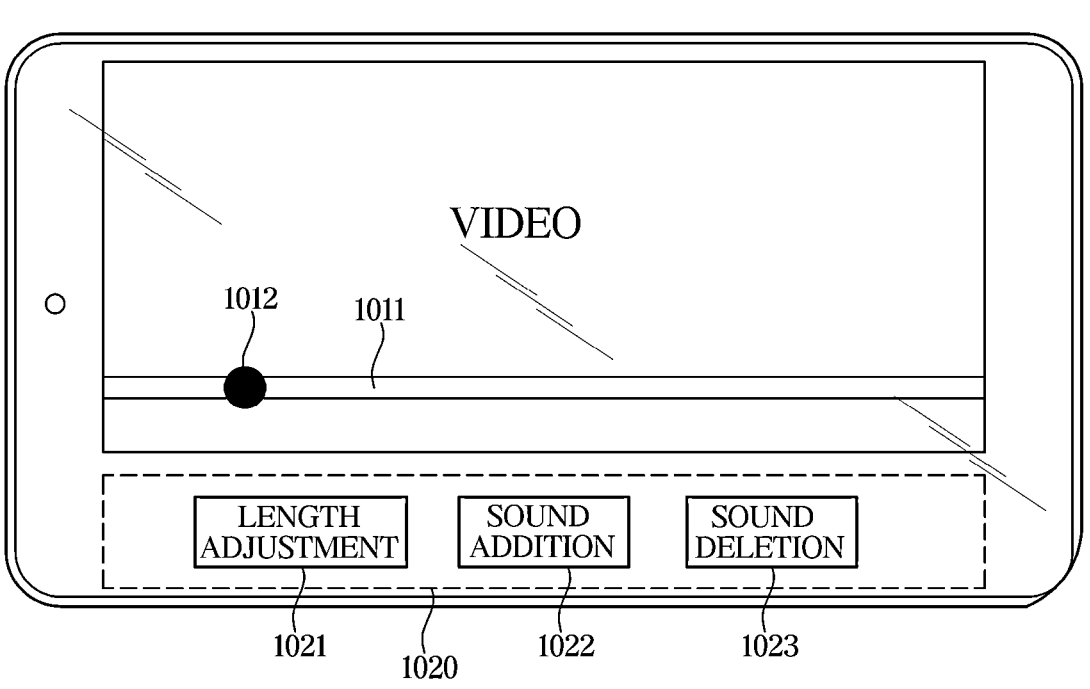
FIG. 10 illustrates a summary video provided through a user device and a graphic user interface for editing the summary video.

FIG. 10 illustrates a summary video provided through a user device and a graphic user interface for editing the summary video.

Referring to FIG. 10, the user device 2 may be a smart phone. The user device 2 may receive a summary video of a cooking process from the server 3. The display of the user device 2 may display the summary video of the cooking process. The summary video may be displayed on a partial area 1010 of the display of the user device 2, and a tool bar for editing the summary video may be displayed on another partial area 1020.

A scroll bar 1011 for changing a playback position of the video may be displayed in the partial area 1010 together with the summary video. In addition, an indicator 1012 for indicating a current playback position of the video may be displayed on the scroll bar 1011. When a user's touch is input to the scroll bar 1011, the video may be played from a playback position touched by the user.

The toolbar displayed in the other partial area 1020 may include a length adjustment button 1021 for adjusting the length of the summary video, a sound addition button 1022 for adding a sound to the summary video, and a sound deletion button 1023 for deleting a sound from the summary video. In response to the user pressing the length adjustment button 1021, the sound addition button 1022, or the sound deletion button 1023, another user interface screen related to each button may be displayed. According to a user input received through the user interface screen, an image editing signal may be generated, and the image editing signal may be transmitted to the server 3. The server 3 may adjust the length of the summary video, add a sound, and/or delete a sound according to the image editing signal.

As described above, a summary video of a cooking process is displayed through the user device 2, and an editing function for the summary video is provided, so that user convenience may be improved.

Figure 11:
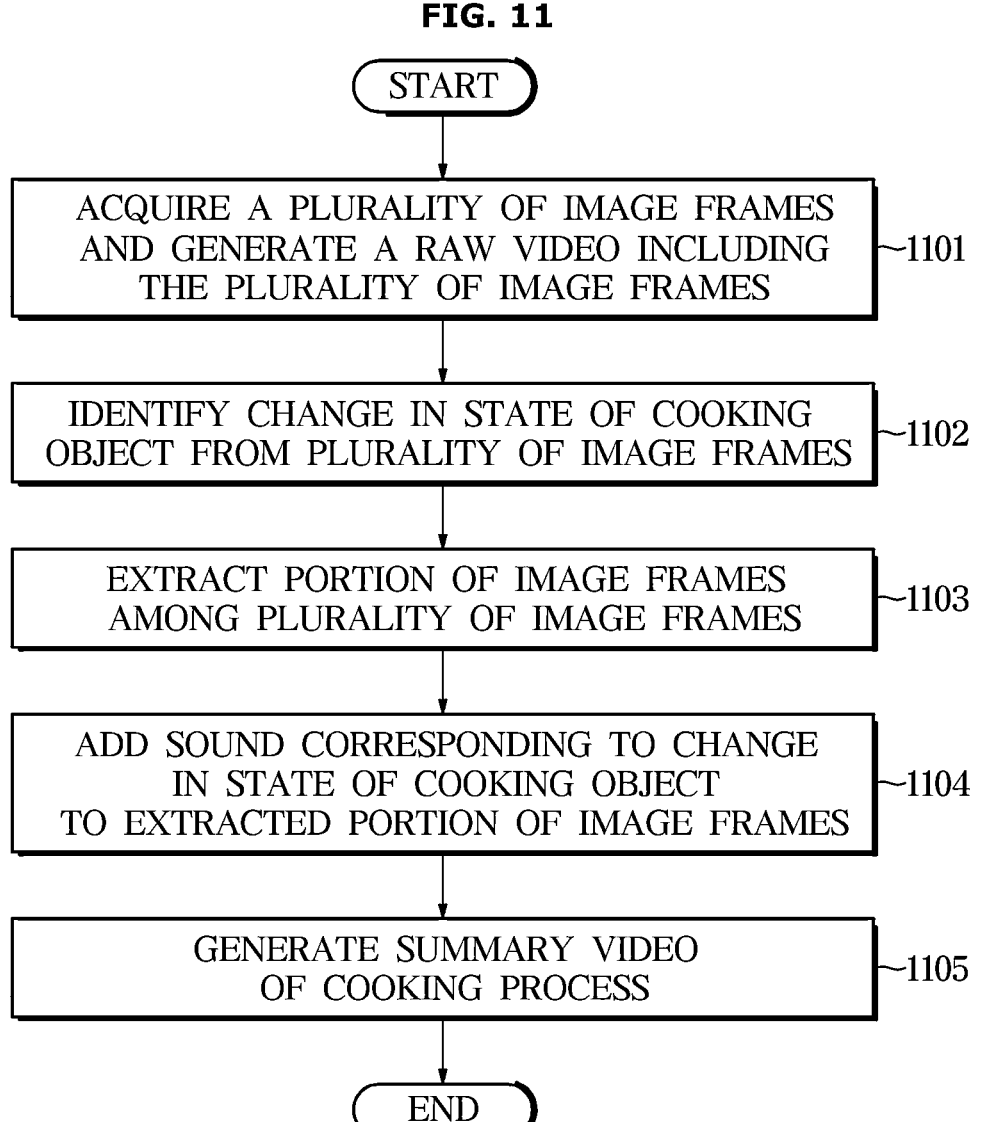
FIG. 11 is a flowchart showing a method of controlling a cooking apparatus according to an embodiment.

FIG. 11 is a flowchart showing a method of controlling a cooking apparatus according to an embodiment.

Referring to FIG. 11, the controller 200 of the cooking apparatus 1 may, upon a start of cooking a cooking object, control the camera 60 to acquire a plurality of image frames and generate a raw video including the plurality of image frames (1101). The cooking of the cooking object may be started by a user input acquired through the user interface 40 or automatically when the door 20 is closed. A cooking course for cooking the cooking object may be selected by a user input or may be automatically selected according to a result of identifying the cooking object. The controller 200 may generate a raw video after cooking of the cooking object is completed, but the point in time at which the raw video is generated is not limited to the example.

The controller 200 may identify a change in a state of the cooking object from the plurality of image frames (1102).

The controller 200 may identify the change in the state of the cooking object by detecting at least one of a change in a size of the cooking object, a change in a shape of the cooking object, a change in a color of the cooking object, and a change in a texture of the cooking object. The controller 200 may identify the change in the state of the cooking object by comparing a reference image frame with each of the plurality of image frames. The controller 200 may compare image frames acquired at different points in time to determine the amount of the change in the state of the cooking object.

The controller 200 may also calculate the amount of the change in the state of the cooking object. The amount of the change in the state of the cooking object may include at least one of the amount of change in the size of the cooking object, the amount of change in the shape of the cooking object, the amount of change in the color of the cooking object, and the amount of the change in the texture of the cooking object. In addition, the controller 200 may estimate the property of the cooking object. The property of the cooking object may include the type, quantity, number, and/or size of the cooking object.

The controller 200 may extract a portion of image frames among the plurality of image frames based on the state change of the cooking object (1103). The controller 200 may add a sound corresponding to the change in state of the cooking object to the extracted portion of image frames (1104). The controller 200 may generate a summary video of the cooking process including the portion of image frames to which the sound is added (1105).

Figure 12:
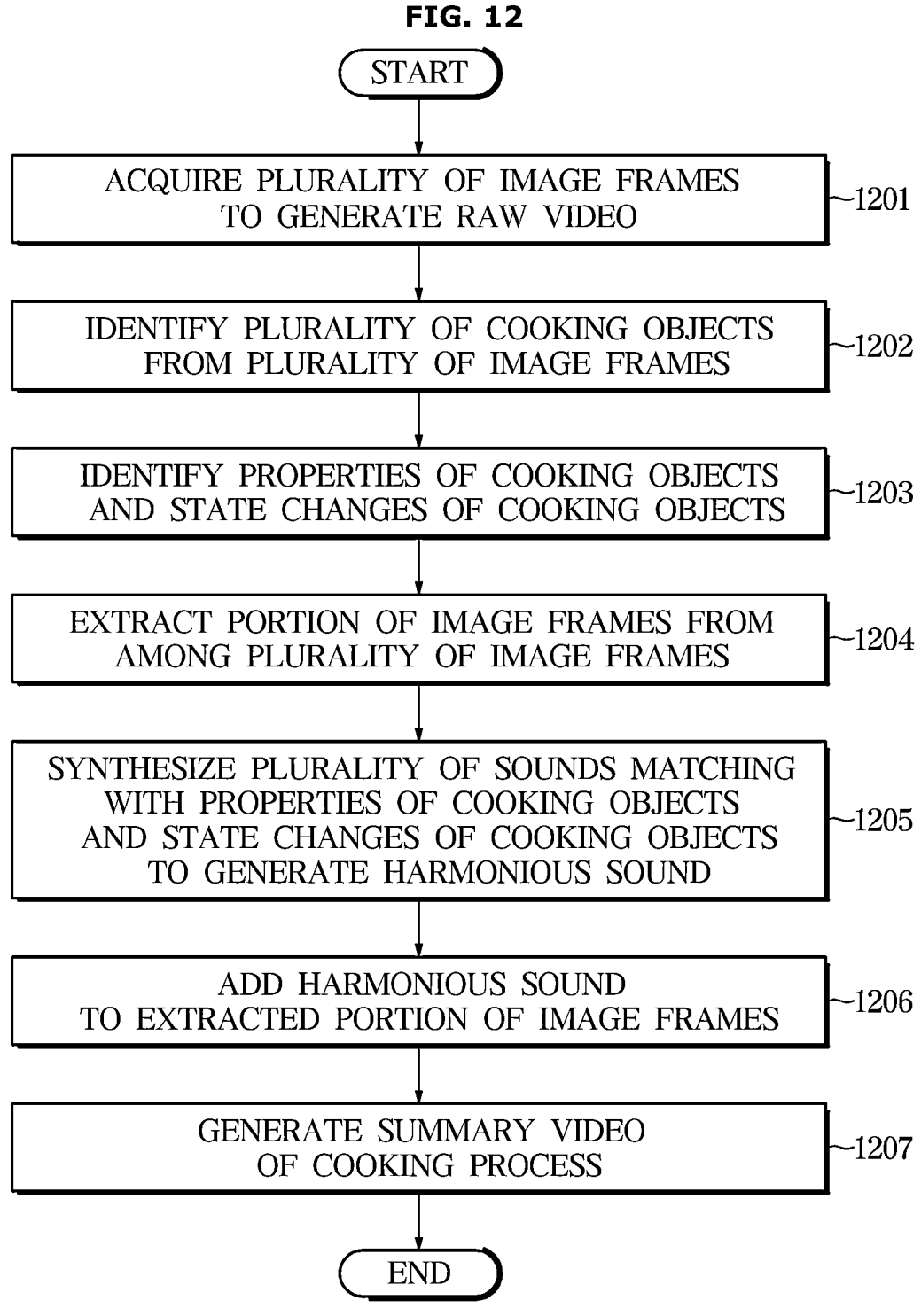
FIG. 12 is a flowchart showing a method of controlling a cooking apparatus when a plurality of cooking objects are cooked.

FIG. 12 is a flowchart showing a method of controlling a cooking apparatus when a plurality of cooking objects are cooked.

Referring to FIG. 12, the controller 200 of the cooking apparatus 1 may, upon a start of cooking a cooking object, control the camera 60 to acquire a plurality of image frames, and generate a raw video including the plurality of image frames (1201). When a plurality of cooking objects are present in the chamber 50, the controller 200 may identify the plurality of cooking objects from the plurality of image frames (1202). The controller 200 may identify properties of the plurality of cooking objects and changes in states of the plurality of cooking objects (1203). The controller 200 may extract a portion of image frames from among the plurality of image frames based on the properties of the plurality of cooking objects and the changes in states of the plurality of cooking objects (1204).

The controller 200 may synthesizing a plurality of sounds that match with the properties of the plurality of cooking objects and the changes in the states of the plurality of cooking objects to generate a harmonious sound (1205). The controller 200 may add the harmonious sound to the extracted portion of image frames (1206). In addition, the controller 200 may determine the volumes of the plurality of sounds to be different based on the properties of the plurality of cooking objects. The controller 200 may generate a summary video of the cooking process including the extracted portion of image frames to which the harmonious sound is added (1207).

Figure 13:
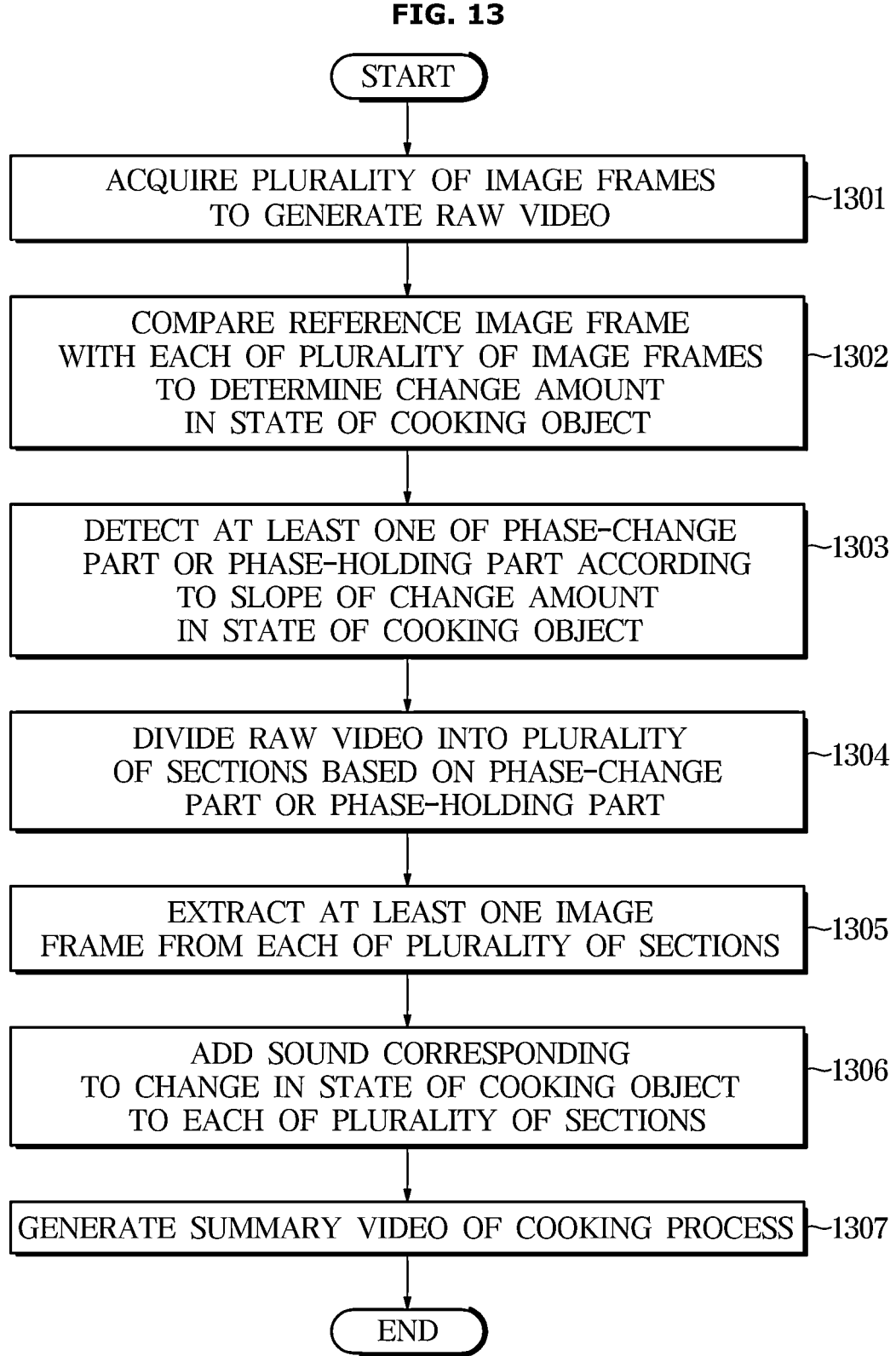
FIG. 13 is a flowchart showing a part of operations of a method of controlling a cooking apparatus described with reference to FIGS. 11 and 12 in more detail.

FIG. 13 is a flowchart showing a part of operations of a method of controlling a cooking apparatus described with reference to FIGS. 11 and 12 in more detail.

Referring to FIG. 13, the controller 200 of the cooking apparatus 1 may, upon a start of cooking a cooking object, control the camera 60 to acquire a plurality of image frames and generate a raw video including the plurality of image frames (1301).

The controller 200 may compare a reference image frame with each of the plurality of image frames to identify a change in the state of the cooking object, and determine the amount of the change in the state of the cooking object (1302). For example, the controller 200 may compare a reference image frame transmitted from the server 3 with each of a plurality of image frames acquired by the camera 60 while a cooking object is being cooked. As another example, the controller 200 may set an image frame acquired by the camera 60 at a start of cooking as a reference image frame and compare the reference image frame with image frames acquired thereafter. As another example, the controller 200 may convert an image frame acquired by the camera 60 at each specific point in time during cooking to a reference image frame, and compare image frames acquired thereafter with the reference image frame. In other words, the controller 200 may set an image frame acquired at a time n–1 as a reference image frame and compare the image frame with an image frame acquired at a time n.

Upon comparison, image frames acquired at different point in time, at least one of a change in the size of the cooking object, a change in the shape of the cooking object, a change in the color of the cooking object, and a change in the texture of the cooking object may be detected. The controller 200 may detect the change in the shape of the cooking object, the change in the color of the cooking object, or the change in the texture of the cooking object, to determine the amount of the change in the state of the cooking object.

The controller 200 may detect at least one of a phase-change section in which the slope of the amount of the change in the state the cooking object is greater than or equal to a predetermined threshold value and a phase-holding section in which the slope of the amount of the change in the state the cooking object remains less than the threshold value (1303). The controller 200 may divide the raw video into a plurality of sections based on the phase-change section and/or the phase-holding section (1304). For example, the controller 200 may divide the raw video into a plurality of sections based on a starting time and an ending time of the phase-change section. The raw video may be divided into a plurality of sections based on a starting time and an ending time of the phase-holding section. The phase-change section and the phase-holding section may each be determined as one section. The controller 200 may extract at least one image frame from each of the divided plurality of sections to acquire a portion of image frames (1305).

The controller 200 may add a sound corresponding to the change in the state of the cooking object to each of the plurality of sections (1306). The controller 200 may determine the sound to be added to each of the plurality of sections using a sound matching table stored in the memory 220. When the change in the state of the cooking object is different for each of the divided plurality of sections, the controller 200 may add a different sound to each of the divided plurality of sections. When a plurality of cooking objects are detected in the chamber 50, the controller 200 may synthesize a plurality of sounds matching with the properties of the plurality of the cooking objects and the changes in state of the plurality of cooking objects to generate a harmonious sound, and add the harmonious sound to each of the plurality of sections. The controller 200 may generate a summary video of the cooking process including the portion of image frames to which the harmonious sounds are added (1307).

Figure 14:
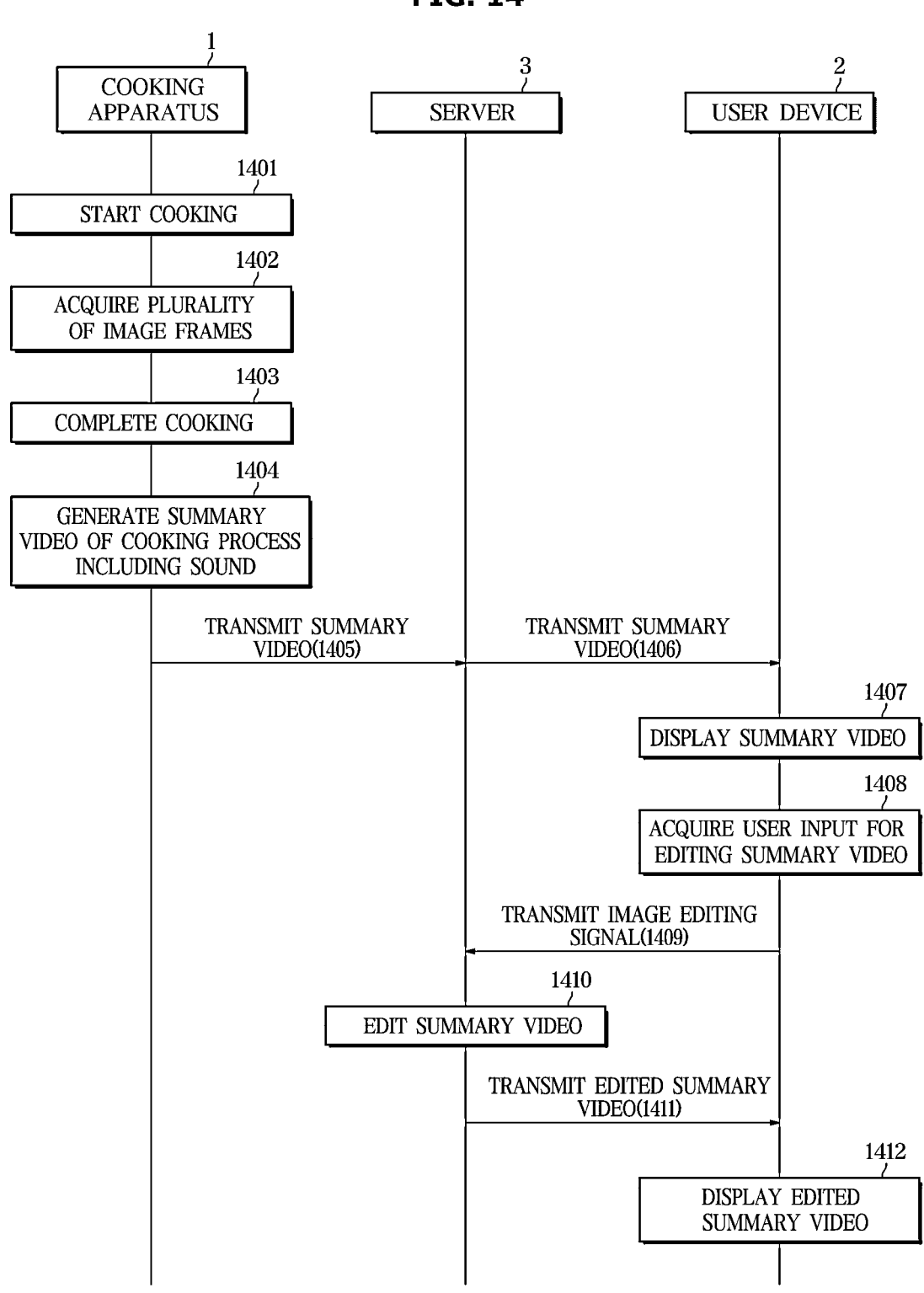
FIG. 14 is a flowchart for describing an example of interaction between a cooking apparatus, a server, and a user device.

FIG. 14 is a flowchart for describing an example of interaction between a cooking apparatus, a server, and a user device.

Referring to FIG. 14, the cooking apparatus 1 may, upon a start of cooking (1401), control the camera 60 to acquire a plurality of image frames (1402). The cooking apparatus 1 may, upon a completion of cooking (1403), generate a summary video of the cooking process including a sound (1404). A method of generating the summary video of the cooking process including the sound is the same as described above.

The cooking apparatus 1 may transmit the summary video to the server 3 (1405). The server 3 may transmit the summary video to the user device 2 (1406). The server 3 may, upon request of the user device 2, transmit the summary video to the user device 2. For example, upon an application for playing and editing the summary video being executed by the user device 2, the user device 2 may receive the summary video from the server 3.

The user device 2 may display the summary video through the display (1407). In addition, the user device 2 may acquire a user input for editing the summary video (1408). The summary video may be displayed on a partial area 1010 of the display of the user device 2, and a tool bar for editing the summary video may be displayed on another partial area 1020.

The user device 2 may transmit an image editing signal corresponding to a user input for editing the summary video to the server 3 (1409). The server 3 may, in response to the image editing signal, edit the summary video (1410). The server 3 may adjust the length of the summary video, add a sound, and/or delete a sound according to the image editing signal.

The server 3 may transmit the edited summary video to the user device 2 (1411). Accordingly, the edited summary video may be displayed on the user device 2 (1412). A summary video of a cooking process may be provided through the user device 2, and an editing function for the summary video may be provided, so that user convenience may be improved.

Figure 15:
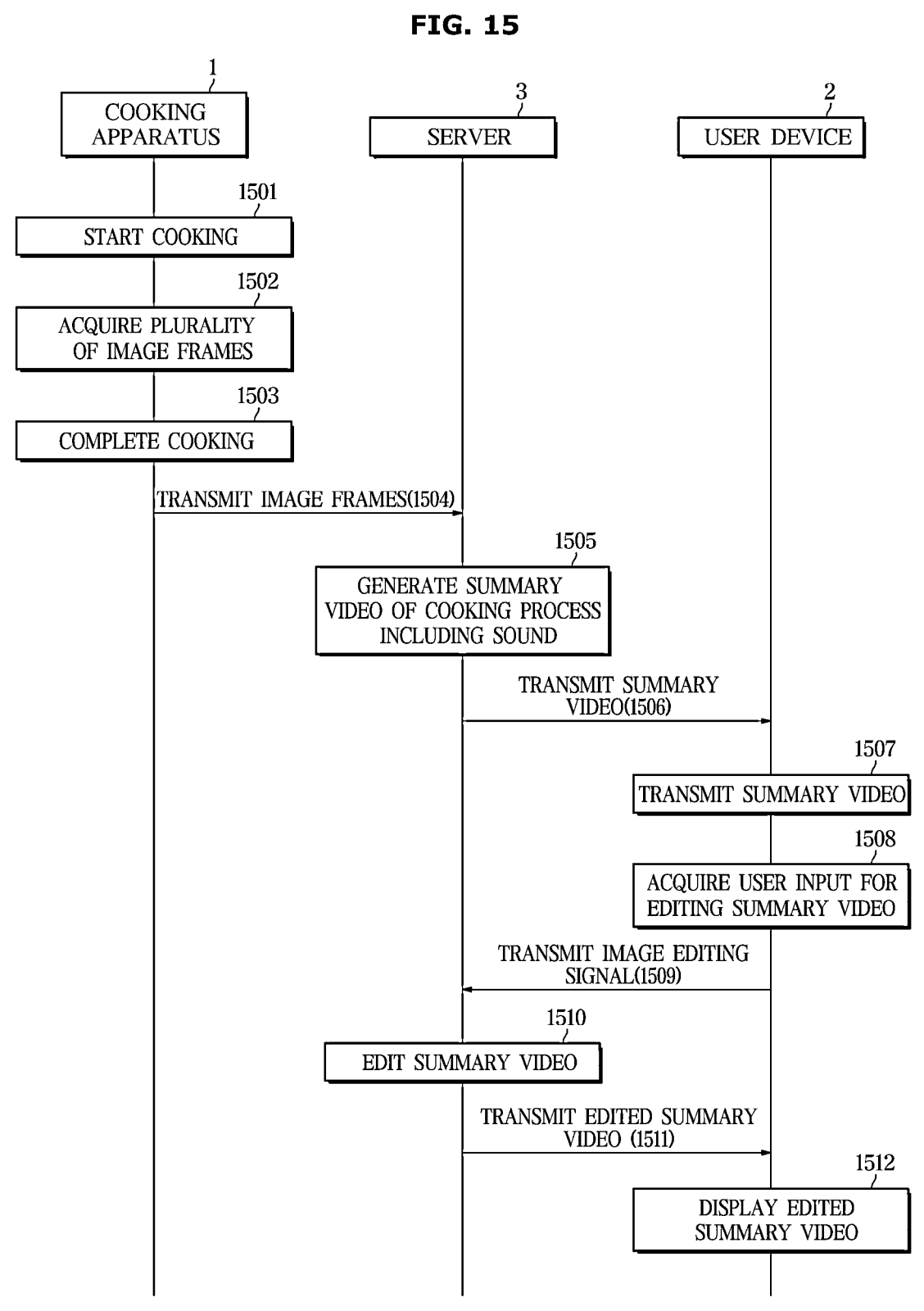

FIG. 15 is a flowchart for describing another example of interaction between a cooking apparatus, a server, and a user device.

Referring to FIG. 15, the cooking apparatus 1 may, upon a start of cooking (1501), control the camera 60 to acquire a plurality of image frames (1502). The cooking apparatus 1 may, upon a completion of cooking (1503), transmit the plurality of image frames to the server 3 (1504). The cooking apparatus 1 may pre-process the raw video and transmit the pre-processed video to the server 3. In order to improve transmission speed, the raw video may be subject to a pre-processing to reduce the capacity and/or size of the raw video.

The server 3 may process the plurality of image frames received from the cooking apparatus 1 and generate a summary video of the cooking process including a sound (1505). A method of generating the summary video of the cooking process including the sound is the same as described above.

The server 3 may transmit the summary video to the user device 2 (1506). The server 3 may, upon request of the user device 2, transmit the summary video to the user device 2. The user device 2 may display the summary video through the display (1507). In addition, the user device 2 may acquire a user input for editing the summary video (1508).

The user device 2 may transmit an image editing signal corresponding to the user input for editing the summary video to the server 3 (1509). The server 3 may, in response to the video editing signal, edit the summary video (1510). The server 3 may, in response to the image editing signal, adjust the length of the summary video, add a sound, and/or delete a sound. The server 3 may transmit the edited summary video to the user device 2 (1511). Accordingly, the edited summary video may be displayed on the user device 2 (1512).

A cooking apparatus according to an embodiment may include: a chamber (50); a camera (60) provided to photograph an inside of the chamber; and a controller (200) electrically connected to the camera, wherein the controller is configured to control the camera to acquire a plurality of image frames while cooking is being performed, identify a change in a state of the cooking object in the chamber from the plurality of image frames, extract a portion of image frames among the plurality of image frames based on the change in the state of the cooking object, and add a sound corresponding to the change in the state of the cooking object to the extracted portion of image frames to generate a summary video.

The controller may be configured to: divide, based on the change in the state of the cooking object, a raw video generated by the plurality of image frames into plurality of sections; and extract at least one image frame from each of the divided plurality of sections to acquire the portion of image frames.

The controller may be configured to: compare a reference image frame with each of the plurality of image frames to determine an amount of the change in the state of the cooking object in each of the plurality of image frames; detect at least one of a phase-change section in which a slope of the amount of the change in the state of the cooking object is greater than or equal to a predetermined threshold value and a phase-holding section in which a slope of the amount of the change in the state of the cooking object remains less than the threshold value; and divide the raw video into the plurality of sections based on the at least one of the phase-change section and the phase-holding section.

The controller may be configured to, based on the change in the state of the cooking object being different in each of the divided plurality of sections, add a different sound to each of the divided plurality of sections.

The cooking apparatus may further include a memory that stores a sound matching table including sound information that matches with a property of the cooking object and a change in a state of the cooking object, wherein the controller may be configured to use the sound matching table to determine the sound to be added to each of the plurality of sections.

The cooking apparatus may further include a memory that may store a sound matching table including sound information matching with a property of the cooking object and a change in a state of the cooking object, wherein the controller may be configured to, based on a plurality of cooking objects being identified in the chamber; identify properties of the plurality of cooking objects and changes in states of the plurality of cooking objects; synthesize a plurality of sounds respectively matching with the properties of the plurality of cooking objects and the changes in the states of the plurality of cooking objects to generate a harmonious sound; and add the harmonious sound to the extracted portion of image frames.

The controller may be configured to determine a volume of each of the plurality of sounds to be different based on the property of each of the plurality of cooking objects.

The controller may be configured to insert metadata including time information, cooking object state information and sound information into each of the image frames in the extracted portion.

The controller may be configured to detect at least one of a change in a size of the cooking object, a change in a form of the cooking object, a change in a color of the cooking object, and a change in a texture of the cooking object to identify the change in the state of the cooking object.

The cooking apparatus may further include a communication circuit configured to communicate with a server, wherein the controller is configured to control the communication circuit to transmit, to the server, display information for displaying the summary video to a user device.

A method of controlling a cooking apparatus according to an embodiment includes: controlling a camera to acquire a plurality of image frames while cooking is being performed; identifying a change in a state of a cooking object in a chamber from the plurality of image frames; extracting a portion of image frames among the plurality of image frames based on the change in the state of the cooking object; and adding a sound corresponding to the change in the state of the cooking object to the extracted portion of image frames to generate a summary video.

The extracting of the portion of image frames may include: dividing, based on the change in the state of the cooking object, a raw video generated by the plurality of image frames into plurality of sections; and extracting at least one image frame from each of the divided plurality of sections to acquire the portion of image frames.

The dividing into the plurality of sections may include: comparing a reference image frame with each of the plurality of image frames to determine an amount of the change in the state of the cooking object in each of the plurality of image frames; detecting at least one of a phase-change section in which a slope of the amount of the change in the state of the cooking object is greater than or equal to a predetermined threshold value and a phase-holding section in which a slope of the amount of the change in the state of the cooking object remains less than the threshold value; and dividing the raw video into the plurality of sections based on the at least one of the phase-change section and the phase-holding section The generating of the summary video may include, based on the change in the state of the cooking object being different in each of the divided plurality of sections, adding a different sound to each of the divided plurality of sections.

The generating of the summary video may include: acquiring a sound matching table including sound information that matches with a property of the cooking object and a change in a state of the cooking object; and using the sound matching table to determine the sound to be added to each of the plurality of sections.

The identifying of the change in the state of the cooking object may include, based on a plurality of cooking objects being identified in the chamber, identifying properties of the plurality of cooking objects and changes in states of the plurality of cooking object.

The generating of the summary video may include: acquiring a sound matching table including sound information that matches with a property of the cooking object and a change in a state of the cooking object; synthesizing a plurality of sounds respectively matching with the properties of the plurality of cooking objects and the changes in the states of the plurality of cooking objects to generate a harmonious sound; and adding the harmonious sound to the extracted portion of image frames.

The generating of the harmonious sound may include determining a volume of each of the plurality of sounds to be different based on the property of each of the plurality of cooking objects.

The generating of the harmonious sound may include inserting metadata including time information, cooking object state information and sound information into each of the image frames in the extracted portion.

The identifying of the change in the state of the cooking object may include detecting at least one of a change in a size of the cooking object, a change in a form of the cooking object, a change in a color of the cooking object, and a change in a texture of the cooking object.

The method may further include controlling a communication circuit to transmit, to the server, display information for displaying the summary video to a user device.

As described above, the cooking apparatus according to the disclosure and the method of controlling the same can generate a summary video of a cooking process by identifying a change in a state of a cooking object through analysis of a plurality of image frames during cooking of the cooking object and adding a sound suitable for the change in the state of the cooking object.

The cooking apparatus according to the disclosure and the method of controlling the same can provide a user with a summary video into which a sound suitable for a change in a state of a cooking object is inserted. Since the user acquires auditory information as well as visual information from the summary video of the cooking process, the user can more easily identify the cooking process. Accordingly, the user's satisfaction can increase.

Meanwhile, the disclosed embodiments may be embodied in the form of a recording medium storing instructions executable by a computer. The instructions may be stored in the form of program code and, when executed by a processor, may generate a program module and perform the operations of the disclosed embodiments.

The computer-readable recording medium may be provided in the form of a non-transitory storage medium. Here, when a storage medium is referred to as "non-transitory," it can be understood that the storage medium is tangible and does not include a signal (electromagnetic waves), but rather that data is semi-permanently or temporarily stored in the storage medium. For example, a 'non-temporary storage medium' may include a buffer in which data is temporarily stored.

According to one embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store™) online. In the case of online distribution, at least a portion of the computer program product may be stored at least semi-permanently or may be temporarily generated in a storage medium, such as a memory of a server of a manufacturer, a server of an application store, or a relay server.

Although embodiments of the present disclosure have been described with reference to the accompanying drawings, those skilled in the art will appreciate that these inventive concepts may be embodied in different forms without departing from the scope and spirit of the disclosure, and should not be construed as limited to the embodiments set forth herein.

What is claimed is:

1. A cooking apparatus comprising:
a chamber;
a camera configured to photograph a cooking object placed in the chamber; and
a controller to be electrically connected to the camera,
wherein the controller is configured to:
control the camera to acquire a plurality of image frames of the cooking object placed in the chamber while cooking of the cooking object is being performed,
identify a change in a state of the cooking object in the chamber from the acquired plurality of image frames,
extract a portion of image frames among the acquired plurality of image frames based on the change in the state of the cooking object, and add a sound corresponding to the change in the state of the cooking object to the extracted portion of image frames to generate a summary video of a cooking process, the summary video of the cooking process including the extracted portion of image frames with the sound corresponding to the change in the state of the cooking object.

2. The cooking apparatus of claim 1, wherein the controller is configured to:
generate a raw video based on the acquired plurality of image frames,
divide the generated raw video into a plurality of sections based on the change in the state of the cooking object; and
extract at least one image frame from each of the divided plurality of sections to acquire the extracted portion of image frames.

3. The cooking apparatus of claim 2, wherein the controller is configured to:
compare a reference image frame with each of the acquired plurality of image frames to determine an amount of the change in the state of the cooking object in each of the acquired plurality of image frames;
detect at least one of a phase-change section in which a slope of the amount of the change in the state of the cooking object is greater than or equal to a predetermined threshold value and a phase-holding section in which a slope of the amount of the change in the state of the cooking object is less than the threshold value; and
divide the raw video into the plurality of sections based on the at least one of the phase-change section and the phase-holding section.

4. The cooking apparatus of claim 2, wherein the controller is configured to, based on the change in the state of the cooking object being different in each of the divided plurality of sections, add a different sound to each of the divided plurality of sections.

5. The cooking apparatus of claim 4, further comprising a memory that stores a sound matching table including sound information that matches with a property of the cooking object and a change in a state of the cooking object, wherein the controller is configured to use the sound matching table to determine the sound to be added to each of the divided plurality of sections.

6. The cooking apparatus of claim 1, further comprising a memory that stores a sound matching table including sound information that matches with at least one property of the cooking object and a change in a state of the cooking object, wherein the controller is configured to:

based on a plurality of cooking objects being identified in the chamber, identify properties of the plurality of cooking objects and changes in states of the plurality of cooking objects;

synthesize a plurality of sounds respectively matching with the properties of the plurality of cooking objects and the changes in the states of the plurality of cooking objects to generate a harmonious sound; and add the harmonious sound to the extracted portion of image frames.

7. The cooking apparatus of claim 6, wherein the controller is configured to determine a volume of each of the plurality of sounds to be different based on the property of each of the plurality of cooking objects.

8. The cooking apparatus of claim 1, wherein the controller is configured to insert metadata including time information, cooking object state information and sound information into each of the image frames in the extracted portion.

9. The cooking apparatus of claim 1, wherein the controller is configured to detect at least one of a change in a size of the cooking object, a change in a form of the cooking object, a change in a color of the cooking object, and a change in a texture of the cooking object to identify the change in the state of the cooking object.

10. The cooking apparatus of claim 1, further comprising a communication circuit configured to communicate with a server, wherein the controller is configured to control the communication circuit to transmit, to the server, display information to display the summary video to a user device.

11. A method of controlling a cooking apparatus, the method comprising:

controlling a camera to acquire a plurality of image frames of a cooking object placed in a chamber while cooking of the cooking object is being performed;

identifying a change in a state of a cooking object in the chamber from the acquired plurality of image frames;

extracting a portion of image frames among the acquired plurality of image frames based on the change in the state of the cooking object; and generating a summary of video of a cooking process by adding a sound corresponding to the change in the state of the cooking object to the extracted portion of image frames, the summary video of the cooking process including the extracted portion of image frames with the sound corresponding to the change in the state of the cooking object.

12. The method of claim 11, wherein the extracting of the portion of image frames includes:

generating a raw video based on the acquired plurality of image frames;

dividing the generated raw video into a plurality of sections based on the change in the state of the cooking object; and extracting at least one image frame from each of the divided plurality of sections to acquire the extracted portion of image frames.

13. The method of claim 12, wherein the dividing into the plurality of sections includes:

comparing a reference image frame with each of the acquired plurality of image frames to determine an amount of the change in the state of the cooking object in each of the acquired plurality of image frames;

detecting at least one of a phase-change section in which a slope of the amount of the change in the state of the cooking object is greater than or equal to a predetermined threshold value and a phase-holding section in which a slope of the amount of the change in the state of the cooking object remains less than the threshold value; and dividing the raw video into the plurality of sections based on the at least one of the phase-change section and the phase-holding section.

14. The method of claim 12, wherein the generating of the summary video includes, based on the change in the state of the cooking object being different in each of the divided plurality of sections, adding a different sound to each of the divided plurality of sections.

15. The method of claim 14, wherein the generating of the summary video includes:

acquiring a sound matching table including sound information that matches with a property of the cooking object and a change in a state of the cooking object; and using the sound matching table to determine the sound to be added to each of the divided plurality of sections.

16. The method of claim 11, wherein the identifying of the change in the state of the cooking object includes, based on a plurality of cooking objects being identified in the chamber, identifying properties of the plurality of cooking objects and changes in states of the plurality of cooking objects, and the generating of the summary video include:

acquiring a sound matching table including sound information that matches with a property of the cooking object and a change in a state of the cooking object;

generating a harmonious sound by synthesizing a plurality of sounds respectively matching with the properties of the plurality of cooking objects and the changes in the states of the plurality of cooking objects; and adding the harmonious sound to the extracted portion of image frames.

17. The method of claim 16, wherein the generating of the harmonious sound includes determining a volume of each of the plurality of sounds to be different based on the property of each of the plurality of cooking objects.

18. The method of claim 16, wherein the generating of a harmonious sound includes inserting metadata including time information, cooking object state information and sound information into each of the image frames in the extracted portion.

19. The method of claim 11, wherein the identifying of the change in the state of the cooking object includes detecting at least one of a change in a size of the cooking object, a change in a form of the cooking object, a change in a color of the cooking object, and a change in a texture of the cooking object.

20. The method of claim 11, further comprising controlling a communication circuit to transmit, to a server, display information for displaying the summary video to a user device.

* * * * *